(12) United States Patent
Struckmeier et al.

(10) Patent No.: US 7,044,007 B2
(45) Date of Patent: May 16, 2006

(54) FORCE SCANNING PROBE MICROSCOPE

(75) Inventors: Jens Struckmeier, Santa Barbara, CA (US); Doug Gotthard, Carpinteria, CA (US); Ben Ohler, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 10/756,579

(22) Filed: Jan. 13, 2004

(65) Prior Publication Data

US 2005/0081610 A1    Apr. 21, 2005

Related U.S. Application Data

(62) Division of application No. 10/006,085, filed on Dec. 6, 2001, now Pat. No. 6,677,697.

(51) Int. Cl.
  *G01N 13/10*   (2006.01)
  *G01L 5/00*    (2006.01)

(52) U.S. Cl. ........................ 73/862.51; 73/105
(58) Field of Classification Search ............. 73/862.51, 73/862.541, 862.381, 105; 250/306, 307
  See application file for complete search history.

(56) References Cited

U.S. PATENT DOCUMENTS

| | | | |
|---|---|---|---|
| 5,224,376 A | | 7/1993 | Elings et al. .................. 73/105 |
| 5,363,697 A | * | 11/1994 | Nakagawa .................... 73/105 |
| 5,477,732 A | * | 12/1995 | Yasue et al. ................... 73/105 |
| 5,705,741 A | * | 1/1998 | Eaton et al. ................... 73/105 |
| 5,874,668 A | | 2/1999 | Xu et al. ....................... 73/105 |
| 5,925,818 A | * | 7/1999 | Cleveland et al. ............. 73/105 |
| 5,948,972 A | * | 9/1999 | Samsavar et al. ............. 73/105 |
| 6,079,254 A | * | 6/2000 | Chen et al. ................... 73/105 |
| 6,257,053 B1 | * | 7/2001 | Tomita et al. ................. 73/105 |
| 6,452,170 B1 | * | 9/2002 | Zypman et al. ............. 250/306 |
| 6,608,307 B1 | * | 8/2003 | Baur ........................... 250/306 |
| 6,730,905 B1 | * | 5/2004 | Nakagawa et al. .......... 250/306 |
| 6,776,030 B1 | * | 8/2004 | Kirpichnikov et al. ........ 73/105 |

(Continued)

FOREIGN PATENT DOCUMENTS

EP        759536 A1 *  2/1997

(Continued)

OTHER PUBLICATIONS

New Journal of Physics 1 (1999) 6.1-6.11, Single Molecule Force Spectroscopy by AFM Indicates Helical Structure of Poly(ethylene-glycol) in Water, by F. Oesterhelt, M. Rief and H.E. Gaub, month not given.

(Continued)

*Primary Examiner*—Thomas P. Noland
(74) *Attorney, Agent, or Firm*—Boyle Fredrickson Newholm Stein & Gratz S.C.

(57) ABSTRACT

A force scanning probe microscope (FSPM) and associated method of making force measurements on a sample includes a piezoelectric scanner having a surface that supports the sample so as to move the sample in three orthogonal directions. The FSPM also includes a displacement sensor that measures movement of the sample in a direction orthogonal to the surface and generates a corresponding position signal so as to provide closed loop position feedback. In addition, a probe is fixed relative to the piezoelectric scanner, while a deflection detection apparatus is employed to sense a deflection of the probe. The FSPM also includes a controller that generates a scanner drive signal based on the position signal, and is adapted to operate according to a user-defined input that can change a force curve measurement parameter during data acquisition.

21 Claims, 16 Drawing Sheets

U.S. PATENT DOCUMENTS 6,864,483 B1 * 3/2005 Olin ................ 250/307 X
2004/0084618 A1 * 5/2004 Spizig et al. ............. 250/306

FOREIGN PATENT DOCUMENTS

| JP | 06307850 A | * | 11/1994 |
| JP | 08146019 A | * | 6/1996 |
| JP | 08201406 A | * | 8/1996 |
| JP | 09043258 A | * | 2/1997 |
| JP | 10170525 A | * | 6/1998 |
| JP | 2000346782 A | * | 12/2000 |

OTHER PUBLICATIONS

Applied Physics A 68. 173-176 (1999), AFM, a tool for single-molecule experiments, by M. Ludwig, M. Rief, L. Schmidt, H. Li, F. Oesterheld, M. Gautel and H.E. Gaub, month not given.

Analytical Techniques, 2000, Force Spectroscopy with Single Bio-molecules, by H. Clausen-Schauman, M. Seitz, R. Krautbauer and H.E. Gaub pp. 524-530, month not given.

Science, vol. 276, May 1997, Reversible Unfolding of Individual Titin Immunoglobulin Domains by AFM, by M. Rief, M. Gautel, F. Oesterhelt, J. Fernandez and H. Gaub, pp. 1109-1112.

Article in MaxPlanckForschung, "Physicker und Biochmiker ziehen Molekulare Faden", Mar. 2000, pp. 26-31 (English translation included). "Physicists and Biochemists Pull Molecular Strings".

* cited by examiner

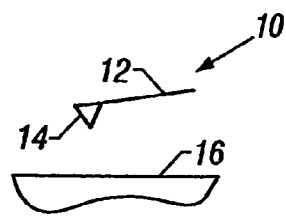
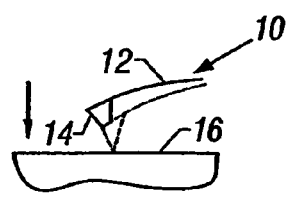
FIG. 1A  FIG. 1B
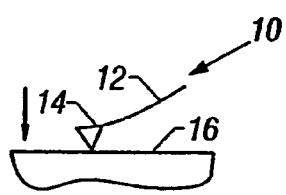
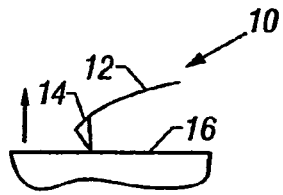
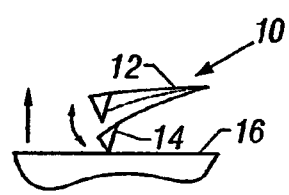
FIG. 1C  FIG. 1D  FIG. 1E
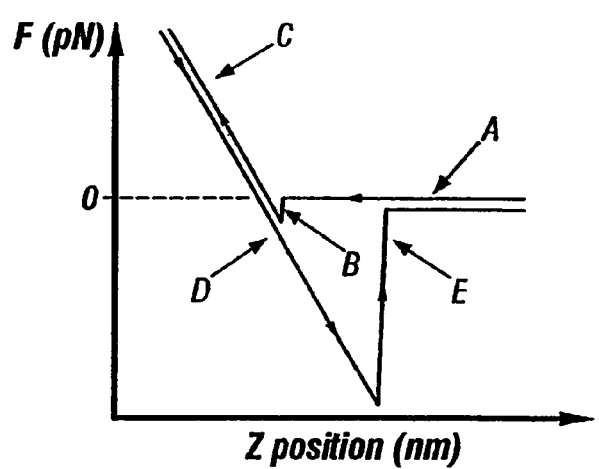
FIG. 2

FORCE SCANNING PROBE MICROSCOPE

CROSS REFERENCE TO RELATED APPLICATION

This application is a divisional of Ser. No. 10/006,085, filed Dec. 6, 2001, and now U.S. Pat. No. 6,677,697, entitled "Force Scanning Probe Microscope", which is expressly incorporated herein by reference.

BACKGROUND OF THE INVENTION

1. Field of the Invention

The present invention is directed to probe microscopes, and more particularly, a probe microscope (PM) apparatus and method for sensing tip-sample interaction forces.

2. Description of Related Art

Developments in nanotechnology have enabled mechanical experiments on a broad range of samples including single molecules, such that fundamental molecular interactions can be studied directly. The mechanical properties of biological molecules, in particular, such as actin filaments and DNA has lead to the development of a range of instrumentation for conducting these studies. In this regard, systems and methods differing in force and dynamic ranges currently being used include magnetic beads, optical tweezers, glass microneedles, biomembrane force probes (BFP), scanning probe microscopy (SPM), and atomic force microscopy (AFM).

With a force sensitivity on the order of a few pico-Newtons ($pN=10^{-12}$ N), an AFM is an excellent tool for probing fundamental force interactions between surfaces. AFM has been used to probe the nature of attractive van der Waals and attractive/repulsive electrostatic forces between systems such as metal probes and insulating mica surfaces, and insulating probes on insulating and conducting samples with materials such as silicon nitride, diamond, alumina, mica, glass and graphite. Other applications include the study of adhesion, friction, and wear, including the formation or suppression of capillary condensation on hydrophilic silicon, amorphous carbon and lubricated $SiO_2$ surfaces.

More particularly, for biological molecules, force is often an important functional and structural parameter. Biological processes such as DNA replication, protein synthesis, drug interaction, to name a few, are largely governed by intermolecular forces. However, these forces are extremely small. With its sensitivity in the pico-Newton scale, the SPM has been employed to analyze these interactions. In this regard, SPMs typically are used to generate force curves that provide particularly useful information for analyzing very small samples.

The knowledge regarding the relation between structure, function and force is evolving and therefore single molecule force spectroscopy, particularly using SPM, has become a versatile analytical tool for structural and functional investigation of single bio-molecules in their native environments. For example, force spectroscopy by SPM has been used to measure the binding forces of different receptor-ligand systems, observe reversible unfolding of protein domains, and investigate polysaccharide elasticity at the level of inter-atomic bond flips. Moreover, molecular motors and their function, DNA mechanics and the operation of DNA-binding agents such as proteins in drugs have also been observed. Further, the SPM is capable of making nano-mechanical measurements (such as elasticity) on biological specimens, thus providing data relative to subjects such as cellular and protein dynamics.

Another main application of making AFM force measurements is in materials science where the study of mechanical properties of nano-scale thin films and clusters is of interest. For example, as microstructures such as integrated circuits continue to shrink, exploring the mechanical behavior of thin films from known properties of the materials becomes increasingly inaccurate. Therefore, continuing demand for faster computers and larger capacity memory and storage devices places increasing importance on understanding nano-scale mechanics of metals and other commonly used materials.

PMs, including instruments such as the atomic force microscope (AFM), are devices that typically use a sharp tip and low forces to characterize the surface of a sample down to atomic dimensions. Generally, AFMs include a probe having a tip that is introduced to a surface of a sample to detect changes in the characteristics of the sample. In this case, relative scanning movement between the tip and the sample is provided so that surface characteristic data can be acquired over a particular region of the sample, and a corresponding map of the sample surface can be generated. However, PMs also include devices such as molecular force probes (MFPs) that similarly use a probe to characterize sample properties but do not scan.

In one application of AFM, either the sample or the probe is translated up and down relatively perpendicularly to the surface of the sample in response to a signal related to the motion of the cantilever of the probe as it is scanned across the surface to maintain a particular imaging parameter (for example, to maintain a set-point oscillation amplitude). In this way, the feedback data associated with this vertical motion can be stored and then used to construct an image of the sample surface corresponding to the sample characteristic being measured, e.g., surface topography. Other types of images are generated directly from the detection of the cantilever motion or a modified version of that signal (i.e., deflection, amplitude, phase, friction, etc.), and are thus not strictly topographical images.

In addition to surface characteristic imaging such as topographical imaging, the AFM can probe nano-mechanical and other fundamental properties of samples and their surfaces. Again, AFM applications extend into applications ranging from measuring colloidal forces to monitoring enzymatic activity in individual proteins to analyzing DNA mechanics.

When measuring biological samples, it is useful to measure, for example, the stiffness of the sample; in one example, to separate salt crystals from DNA or to separate the DNA from a hard surface. In U.S. Pat. No. 5,224,376, assigned to the assignee of the present invention, an atomic force microscope is described in which the system can map both the local the stiffness (force spectroscopy) and the topography of a sample. In the preferred implementation, a stiffness map of the sample is obtained by modulating the force between the tip and sample during a scan by modulating the vertical position of the sample while keeping the average force between the tip and the sample constant. The bending of the cantilever, which is a measure of the force on the tip, is measured by an optical detector that senses the deflection of a light beam reflected from the back of the cantilever. In a simple example, the AFM and force spectroscopy apparatus of this patent has been used to study DNA laying on a glass surface. Modulating the force and then imaging the stiffness of the sample has the advantage that a surface such as glass, which has a rough topographic image, will have a flat stiffness image, permitting soft molecules on it such as DNA to be readily imaged.

Notably, a key element of the probe microscope is its microscopic sensor, i.e., the probe. The probe includes a microcantilever, the design and fabrication of which is well-known in the field, which is typically formed out of silicon, silicon nitride, or glass, and has typical dimensions in the range of 10–1000 microns in length and 0.1–10 microns in thickness. The probe may also include a "tip," which, particularly in AFM, is typically a sharp projection near the free end of the cantilever extending toward the sample. In the more general field of probe microscopy, the tip may be absent or of some other shape and size in order to control the particular type, magnitude, or geometry of the tip-sample interaction or to provide greater access to chemically modify the tip surface.

The second key element of a probe microscope is a scanning mechanism ("the scanner"), which produces relative motion between the probe and the sample. It is well-known by those in the field that such scanners may move either the tip relative to the sample, the sample relative to the tip, or some combination of both. Moreover, probe microscopes include both scanning probe microscopes in which the scanner typically produces motion in three substantially orthogonal directions, and instruments with scanners that produce motion in fewer than three substantially orthogonal directions (i.e.—MFP).

Turning to FIGS. 1A–1E and 2, force spectroscopy using SPM is illustrated. More particularly, FIGS. 1A–1E show how the forces between a tip 14 of a probe 10 and a sample 16, at a selected point (X,Y) on the sample, deflect a cantilever 12 of probe 10 as the tip-sample separation is modulated in a direction generally orthogonal to the sample surface. FIG. 2 shows the magnitude of the forces as a function of sample position, i.e., a force curve or profile.

In FIG. 1A, probe 10 and sample 16 are not touching as the separation between the two is narrowed by moving the sample generally orthogonally toward the sample surface. Zero force is measured at this point of the tip-sample approach, reflected by the flat portion "A" of the curve in FIG. 2. Next, probe 10 may experience a long range attractive (or repulsive force) and it will deflect downwardly (or upwardly) before making contact with the surface. This effect is shown in FIG. 1B. More particularly, as the tip-sample separation is narrowed, tip 14 may "jump" into contact with the sample 16 if it encounters sufficient attractive force from the sample. In that case, the corresponding bending of cantilever 12 appears on the force profile, as shown in FIG. 2 at the curve portion marked "B."

Turning next to FIG. 1C, once tip 14 is in contact with sample 16, the cantilever will return to its zero (undeflected) position and move upwardly as the sample is translated further towards probe 10. If cantilever 12 of probe 10 is sufficiently stiff, the probe tip 14 may indent into the surface of the sample. Notably, in this case, the slope or shape of the "contact portion" of the force curve can provide information about the elasticity of the sample surface. Portion "C" of the curve of FIG. 2 illustrates this contact portion.

In FIG. 1D, after loading cantilever 12 of probe 10 to a desired force value, the displacement of the sample 16 is reversed. As probe 10 is withdrawn from sample 16, tip 14 may either directly adhere to the surface 16 or a linkage may be made between tip 14 and sample 16, such as via a molecule where opposite ends are attached to the tip 14 and surface 16. This adhesion or linkage results in cantilever 14 deflecting downwards in response to the force. The force curve in FIG. 2 illustrates this downward bending of cantilever 14 at portion "D." Finally, at the portion marked "E" in FIG. 2, the adhesion or linkage is broken and probe 10 releases from sample 16, as shown in FIG. 1E. Particularly useful information is contained in this portion of the force curve measurement, which contains a measure of the force required to break the bond or stretch the linked molecule.

An example of a sample force measurement as described above is shown in FIG. 3 where two complimentary strands of DNA 20 are immobilized on the tip and sample surfaces 22 and 24, respectively. By modulating the tip-sample separation, a force curve such as that shown in FIG. 2 can be generated. As a result, a quantitative measurement of the forces and energetics required to stretch and un-bind the DNA duplexes can be mapped.

In sum, a simple force curve records the force on the tip of the probe as the tip approaches and retracts from a point on the sample surface. A more complex measurement known as a "force volume," is defined by an array of force curves obtained as described above over an entire sample area. Each force curve is measured at a unique X-Y position on the sample surface, and the curves associated with the array of X-Y points are combined into a 3-dimensional array, or volume, of force data. The force value at a point in the volume is the deflection of the probe at that position (x, y, z).

Although this example relates specifically to AFM force measurements that use cantilever deflection as a measure of force, those skilled in the art will recognize that there are other physico-chemical properties that can be measured using substantially similar probes, instrumentation, and algorithms.

Although SPMs are particularly useful in making such measurements, there are inherent problems with known systems. In particular, typical SPMs use conventional fine motion piezoelectric scanners that translate the tip or sample while generating topographic images and making force measurements. A piezoelectric scanner is a device that moves by a microscopic amount when a voltage is applied across electrodes placed on the piezoelectric material of the scanner. Overall, the motion generated by such piezoelectric scanners is not entirely predictable, and hence such scanners have significant limitations.

A conventional AFM 30 including a piezoelectric scanner 32 is shown in FIG. 4. Scanner 32 is a piezoelectric tube scanner including an X-Y section 34 and a Z section 36. In this arrangement, Z section 36 of scanner 32 is adapted to support a sample 42.

To make a force measurement, section 34 of scanner 32 translates sample 42 relative to probe 44 of AFM 30 to a selected position (x,y). As noted previously, to actuate scanner 32, sections 34, 36 include electrodes placed thereon (such as 38 and 40 for the X-Y section) that receive appropriate voltage differentials from a controller that, when applied, produce the desired motion. Next, Z section 36 is actuated to translate sample 42 toward a tip 46 of probe 44, as described in connection with the force curve measurement shown in FIGS. 1A–1E and 2. Again, as tip 46 interacts with sample 42, a cantilever 48 of probe 44 deflects. This deflection is measured with a deflection detection system 50. Detection system 50 includes a laser 51 that directs a light beam "L" towards the back of cantilever 48, which is reflective. The beam "L" reflects from cantilever 48, and the reflected beam "L" contacts a beam steering mirror 52 which directs the beam "L" towards a sensor 54. Sensor 54, in turn, generates a signal indicative of the cantilever deflection. Because cantilever deflection is related to force, the deflection signals can be converted and plotted as a force curve.

Standard piezoelectric scanners for SPMs usually can translate in three substantially orthogonal directions, and their size can be modified to allow scan ranges of typically several nanometers to several hundred microns in the X-Y plane and typically <10 microns in the Z-axis. Moreover, depending on the particular implementation of the AFM, the scanner is used to either translate the sample under the cantilever or the cantilever over the sample.

The methods and limitations described above pertaining to current typical scanners in SPM are in many cases acceptable in applications where a probe microscope is being used in conventional imaging modes in which the XY motion is typically periodic and it is acceptable to use a relative measure of Z movement.

However force spectroscopy experiments typically demand more precise control of relative tip-sample motion, particularly in the Z axis (the axis substantially perpendicular to the sample surface).

Typical piezoelectric scanners do not exhibit linear motion, i.e., a given change in the applied drive voltage to the piezo will result in a different magnitude of motion in different areas if the operating range. Typical piezoelectric scanners also commonly exhibit hysteretic motion, i.e., if a particular voltage ramp is applied to the scanner and then the ramp is re-traced exactly in reverse, one finds that the scanner follows a different position path on the extend versus the retract. Piezoelectric scanners also "creep," which means that they continue to extend or retract for a period of time after the applied drive voltage has stopped changing. Piezoelectric tube scanners also typically have low resonant frequencies in the Z-axis. Those skilled in the art recognize that this represents a serious limitation on the range of operating speeds for which the scanner is useful. This is because the piezoelectric material undergoes complex oscillatory motion when passing through and near the resonant frequency.

Any one or more of these limitations clearly jeopardize the integrity of the tip-sample motion, and therefore the corresponding data collected is of marginal usefulness. Overcoming these limitations is one of the key goals of this invention.

Alternative means of relative tip-sample motion exist that address these concerns, although they can create new problems. For instance, sensors can be coupled to piezoelectric scanners by various means well-known in the field. Such sensors can produce a more accurate record of motion compared to the more usual assumption that the control voltage is representative of the motion. However, adding sensors to a scanner only detects, not corrects, these undesirable motions. However, such sensored scanners can be used in a closed-loop feedback configuration in which the motion is monitored during a change in position and the applied drive voltage is modified as necessary to make the actual path of motion more closely match the path specified by the control input signal. Such sensored and closed-loop scanners are most commonly implemented in conjunction with a different mechanical design of the scanner known as a piezo-actuated flexure stage ("stage"). These stages contain mechanical constraints (flexures) on the motion of the stage intended primarily to constrain the motion of the stage to one axis and to mechanically stiffen the stage. This design also presents more obvious possibilities for incorporating a sensor than piezoelectric tube designs, although either is feasible in practice. The flexure stage offers the additional advantage of increasing the resonant frequency of the stage relative to a piezoelectric tube scanner with similar range.

Nevertheless, although the above may seem to suggest a design including closed-loop flexure stages in all three axes, in practice such a design has significant drawbacks. Among the disadvantages of a three-flexure stage design, is that 3-axis flexure stages are much larger than a typical piezoelectric tube scanner of similar range due to the added mass and volume of the constraining mechanism and sensors. In practice, larger designs more readily couple outside vibrational and acoustic noise sources into the motion of the scanner, which significantly degrades the scanners usefulness for force spectroscopy. Closed-loop flexure stages are also significantly more expensive than piezoelectric tube scanners of similar range.

Therefore, the use of flexure stages for all three axes is not desirable for the design of a compact, low-noise, relatively inexpensive instrument.

There are also drawbacks associated with the methods employed to make conventional force curve measurements. Experimentally, a force curve measurement is made by applying, for example, a cyclical triangle wave voltage pattern to the electrodes of the Z-axis scanner as shown in FIG. 5A. The triangle wave drive signal causes the scanner to expand and then contract in the vertical direction, generating relative motion between the probe and the sample. In such a system, the amplitude of the triangle wave as well as the frequency of the wave can be controlled so that the researcher can linearly vary the distance and speed that the AFM cantilever tip travels during the force measurement. In FIG. 5B, a drive signal similar to that shown in FIG. 5A is illustrated. However, in this case, the drive signal includes a pause between each change in the direction of Z scanner motion. In each case, the drive signal is cyclical. However, oftentimes it is desired to modify the parameters of the force measurement in a non-cyclical manner, including the speed at which the tip-sample separation is modulated, the duration of a pause (to allow molecular binding between tip and molecules on the surface, for example), etc. to analyze forces corresponding to, for example, complex mechanical models of certain samples. In this regard it is notable that conventional systems often lack flexibility in making measurements that are non-cyclic. Therefore, a system was desired in which the flexibility in performing the force measurement is improved. For example, a specific change or rate of change in tip-sample force or a specific value of a tip-sample force may indicate some property pertaining to the sample in question. In response, it would be desirable to alter a force curve measurement parameter (such as the speed of the movement) in response to a specific measurement condition. Or, for example it may be desirable to instead of following a path of position (separation) versus time, follow a path of force versus time where the position (separation) is controlled to produce the desired force profile.

Overall, the field of making force measurements with a probe microscope was in need of a system including a scanner that is contained in a relatively small package, provides a large Z-axis range with accurate control of Z motion, and has a relatively high resonance frequency. Moreover, the field was in need of a system capable of performing force measurements according to particular forces measured, and according to particular profiles to maximize the flexibility of making the force measurement. Although not a fundamental requirement for force spectroscopy, SPM-based system may also be made capable of making conventional AFM measurements (e.g., topography) by simply switching modes of operation.

SUMMARY OF THE INVENTION

The preferred embodiment overcomes the drawbacks of prior art systems by providing a force scanning probe microscope (FSPM) that combines a flexured Z stage and a piezoelectric tube XY scanner. More particularly, the Z actuator stage is sensored so that proper tip-sample positioning is maintained, thus maximizing the integrity of the force curve measurements. Moreover, the FSPM takes advantage of the ability to make improved force measurements with more exact positioning by also being adapted to operate according to user-defined position/force profiles, as well as having the ability to change a force measurement parameter in response to a trigger condition. In addition to these automatic control features, the FSPM also includes a manual control device that allows a user to manipulate tip-sample separation according to an alert feedback, such as a tactile or audio alert. Although not a fundamental requirement for force spectroscopy, the probe microscope based FSPM may also be made capable of operating in conventional AFM modes.

According to a first aspect of the preferred embodiment, a piezoelectric scanner includes a piezoelectric tube that generates scanner motion in two substantially orthogonal axes defining a substantially planar surface ("the scan plane"). In addition, the scanner includes a flexured piezoelectric stage that generates scanner motion in a third axis substantially orthogonal to the scan plane. Moreover, the piezoelectric stage is preferably coupled to the piezoelectric tube.

According to another aspect of the preferred embodiment, the sensor includes a displacement sensor that detects motion in the third axis and generates a corresponding position signal.

In another aspect of this embodiment, the scanner is disposed in a probe microscope having a probe and a detection apparatus that senses motion of the probe. A sample is positioned such that the scanner produces relative tip-sample motion, and the displacement sensor is mounted on the stage.

According to a still further aspect of the preferred embodiment, the stage and sensor are connected to a data acquisition and control system, and wherein the data acquisition and control system generates a control signal that drives the stage. Also, the control signal is preferably generated in response to a user input, where the user input can be a position or force profile, which may include triggers.

According to an alternate aspect of the preferred embodiment, the user input corresponds to a desired scanner motion, and the control signal drives the stage so the scanner motion in the third axis is generally the same as the desired scanner motion.

According to a still further aspect of the preferred embodiment, a force scanning probe microscope (FSPM) includes a piezoelectric scanner having a surface that supports the sample so as to move the sample in three substantially orthogonal directions. The FSPM also includes a displacement sensor that measures movement of the sample in a direction substantially orthogonal to the surface and generates a corresponding position signal so as to provide closed loop position feedback. In addition, a probe is fixed relative to the piezoelectric scanner, while a probe motion detection apparatus is employed to sense motion of the probe. The FSPM also includes a data acquisition and control system that generates a scanner drive signal based on the position signal and a user-defined input that can change a force curve measurement parameter during data acquisition.

In yet another aspect of the invention, a method of making a force curve measurement on a sample includes the step of providing an probe microscope having a probe. Next, the method produces relative motion between the probe and the sample in response to a user-defined input defining intended motion in a direction substantially orthogonal to a surface of the sample. In addition, the method includes detecting the relative motion and comparing the relative motion to the corresponding intended motion. Further, motion of the probe is measured when the sample interacts with the probe, and a measurement parameter(s) can be changed in response thereto.

According to another aspect of the invention, a method of making a force curve measurement on a sample includes the steps of generating a drive signal to modulate a separation between the probe and the sample according to a user-defined input. In addition, the method includes measuring the separation and controlling the drive signal in response to the measuring step. Thereafter, motion of the probe is detected in response to the generating step. The method then includes changing a measurement parameter in response to the detecting step.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 1A–1E illustrate a probe of an SPM as it is actuated to approach and retract from a surface so that the tip-sample forces can be mapped;

FIG. 2 is a plot illustrating force data obtained by the operation shown in FIGS. 1A–1E;

DETAILED DESCRIPTION OF THE PREFERRED EMBODIMENT

Figure 6:
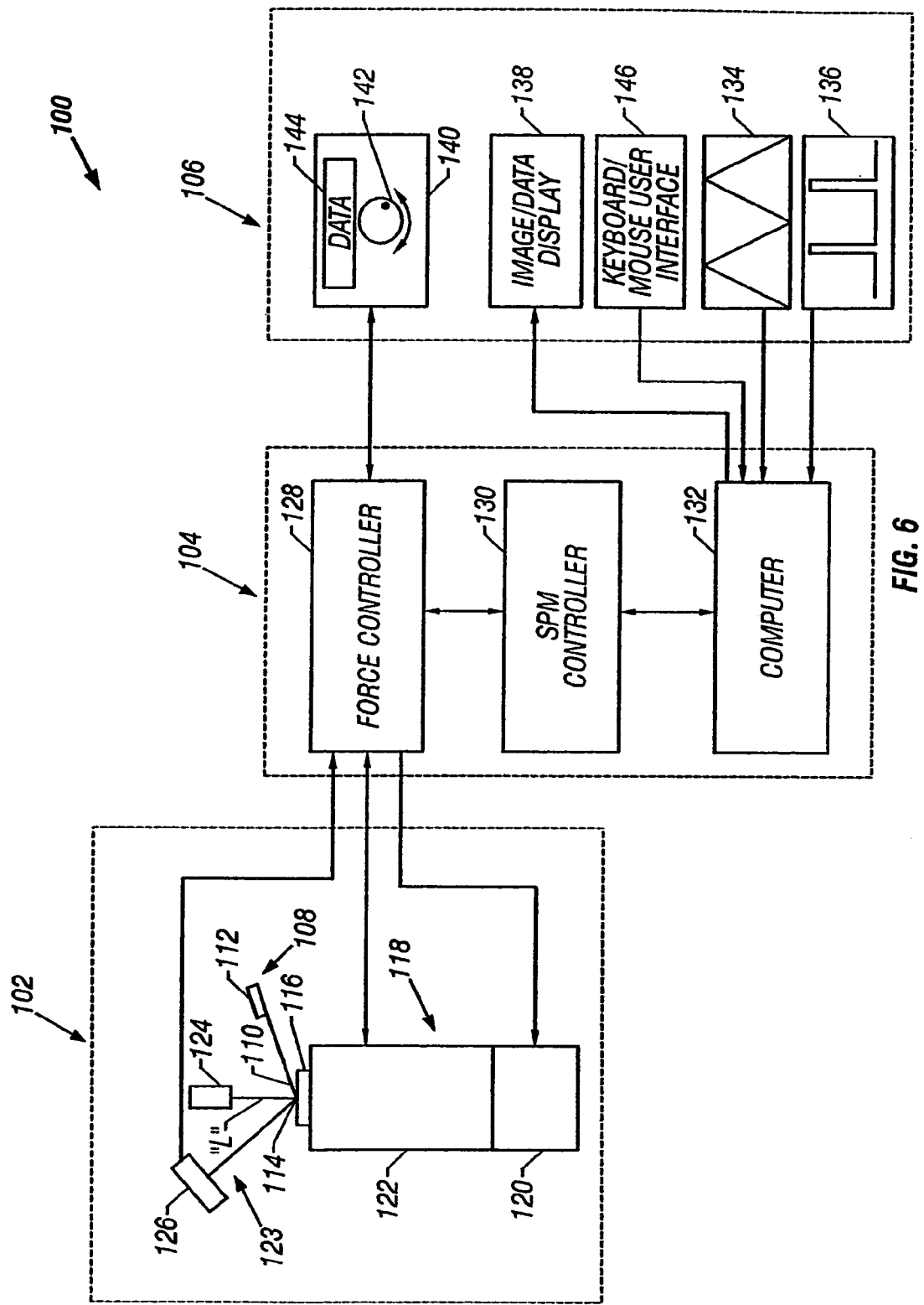
FIG. 6 is a diagram illustrating a force scanning probe microscope (FSPM) system according to a preferred embodiment of the invention, including a sensored scanner, a control system that maximizes force curve measurement flexibility and a mechanical feedback user interface.

Turning initially to FIG. 6, a force scanning probe microscope (FSPM) 100 that provides highly accurate force measurements, including force volume measurements, with a high degree of data acquisition flexibility is illustrated. FSPM 100 includes an atomic force microscope (AFM) 102, a data acquisition and control system 104, and a user interface 106. Probe microscope 102 includes a probe 108 having a cantilever 110 extending from a substrate 112. Cantilever 110 includes a free end to which a tip 114 is coupled so that it extends generally orthogonal to cantilever 110. Probe 108 is placed in a support (not shown), such as a conventional probe holder, thus collectively defining a probe assembly.

Next, a sample 116 is mounted on a piezoelectric scanner 118 in a conventional fashion. The sample 116 may, for instance, comprise a single molecule of a substance of interest. In the preferred implementation, scanner 118 is used to actuate the sample in three substantially orthogonal directions, X, Y, and Z. Notably, movement in the X,Y directions defines a scan plane generally parallel to the measured surface of the sample 116, and movement in Z is substantially orthogonal to the scan plan. An important aspect of making the force measurements contemplated by the present invention is precisely modulating the tip-sample separation so the two interact at a particular scan location (x, y). In this regard, some combination of moving both the tip and the sample could be implemented for providing the relative 3-D movement.

According to the preferred embodiment, and as described in further detail below, scanner 118 includes an X-Y tube scanner 120 that is mounted to the AFM chassis (160 shown in FIG. 8) and moves sample 116 in the scan plane, i.e., generally parallel to a top surface of scanner 118 and the sample surface. As a result, tube 120 operates to position a selected point of the sample beneath, and in-line with, tip 114 of probe 108. Scanner 118 also includes a sensored Z actuator 122, which is supported by X-Y tube 120, and shown schematically in FIG. 10.

During FSPM operation, sensored Z actuator 122 translates sample 116 towards ("approach") and away from ("retract") tip 114 of probe 108 causing interaction between sample 116 and probe 108. In that regard, as probe tip 114 and sample 116 interact, cantilever 110 deflects. This deflection can be measured as a function of Z movement provided by scanner 118 (for example, one or more approach/retract cycles), and the corresponding data can be used to plot a force curve.

The preferred method by which the deflection is measured is by employing a deflection detection apparatus 123 that directs a light beam "L" generated by a source 124 towards the back of cantilever 110. The beam L is then reflected off cantilever 110 and towards a detector 126. The detector 126 can be, for example, a conventional four-cell photodetector that generates a deflection detection signal based on the position of the reflected beam. This signal is then transmitted to data acquisition and control system 104 that communicates with scanner 118 in a closed loop configuration to modulate the tip-sample separation based on a particular set of imaging parameters, as described in further detail below. Preferably, the light beam is produced by a low noise, low coherence length light source 124 (i.e., laser or super luminescent diode).

Notably, such a probe microscope may be operated in a mode where some other probe motion besides deflection (e.g., oscillatory motion) is measured, or wherein the motion (i.e., deflection) of the probe is maintained at some setpoint by application of some external force (i.e., laser pressure), and thus the magnitude of this external force is related to the tip-sample interaction.

As described in greater detail below in conjunction with FIGS. 9 and 10, X-Y scanner 120 is preferably a piezoelectric tube scanner that is coupled to sensored Z actuator or stage 122 via an appropriate coupling. Sensored Z actuator 122, on the other hand, is preferably a piezoelectric flexured stage actuator constructed from a metal mass and including flexure points that provide constrained motion in the intended direction, i.e., in the vertical or "Z" direction in this case. The combination of a tube scanner and a flexure stage actuator provides significant advantages in making force measurements, including scan range, predictable, repeatable motion, and high resonance frequency, detailed below.

With continued reference to FIG. 6, data acquisition and control system 104 communicates with scanner 118 to actuate the scanner according to particular force measurement parameters. More particularly, control system includes a force controller 128, an AFM controller 130 and a computer 132. Force controller 128 operates to modulate tip-sample separation and ensure that the desired Z actuator motion is being maintained via feedback from a sensor (162 in FIG. 8) that monitors either the actual motion of sample 116, or the tip-sample separation directly. Force controller 128 is also coupled to SPM controller 130 that controls motion of scanner 118 to image surface characteristics, for example, to obtain a topography image using a selected SPM mode of operation (e.g., oscillating mode).

Force controller 128 and SPM controller 130 further communicate with computer 132 which provides, in at least some embodiments of the present invention, instructions to controllers 128, 130 according to desired experiments. In general, desired force measurement parameters are communicated to data acquisition and control system 104, so as to achieve flexibility in making force measurements on a wide range of samples (see FIGS. 13A–C, 15A–C, and 17 and their corresponding descriptions) and acquire a permanent record of the data.

Note that the exact nature and routing of the signals and the various controllers to which are referred are relatively unimportant. For instance, control and data channels could be transmitted as analog or digital signals. The separation of control functions into three nominal controllers/computers could just as well be accomplished with a single controller/computer in hardware or software. In short, those skilled in the art could readily conceive other schemes of implementation for the control and data acquisition algorithms described which would still not deviate from the spirit and scope of the underlying inventive concept.

In this regard, force measurement parameters may be modified according to communications from user feedback interface 106 to either computer 132 for automatic control, or directly to force controller 128 for manual control. For example, the control provided by control system 104 may be defined by a user waveform input 134, or a user trigger input 136, according to the operator's desired force measurement, as described in detail below in conjunction with FIGS. 12–17. On the other hand, rather than providing computer control of desired force measurement parameters, these parameters can be communicated directly with the four controller 128 via a mechanical feedback user interface 140.

Mechanical feedback user interface 140 of system 100 is coupled to force controller 128 to allow the user to manually adjust the actuation of scanner 118. Therefore, the user can correspondingly adjust the tip-sample separation. Mechanical feedback interface 140 preferably includes a manipulatable device such as a rotary knob 142 which a user manually manipulates to displace the sample (or probe as appropriate for the particular implementation) to cause sample 116 to interact with tip 114 of the probe 108. In this way, the user can essentially "feel" the sample structure and properties associated with sample 116, based on a measured force that is fed back to manual interface 140 as an alert. In the preferred embodiment, this alert signal can be used to alter a characteristic associated with manipulating knob 142, e.g., torque. The operator can then adjust tip-sample separation to stretch molecules, observe unfolding/refolding of protein domains, etc. Manual interface 140 preferably also includes a display 144 so the FSPM operator can monitor quantitative values associated with the forces being sensed.

Still referring to FIG. 6, computer 132 is coupled to a display 138 to present the actual force, force volume, or SPM image data to the FSPM operator. Moreover, computer 132 of system 104 communicates with a keyboard/mouse or other suitable user interface 146 to allow these various options to be selected by an operator via, for example, a graphical user interface (GUI) (not shown).

Figure 7:
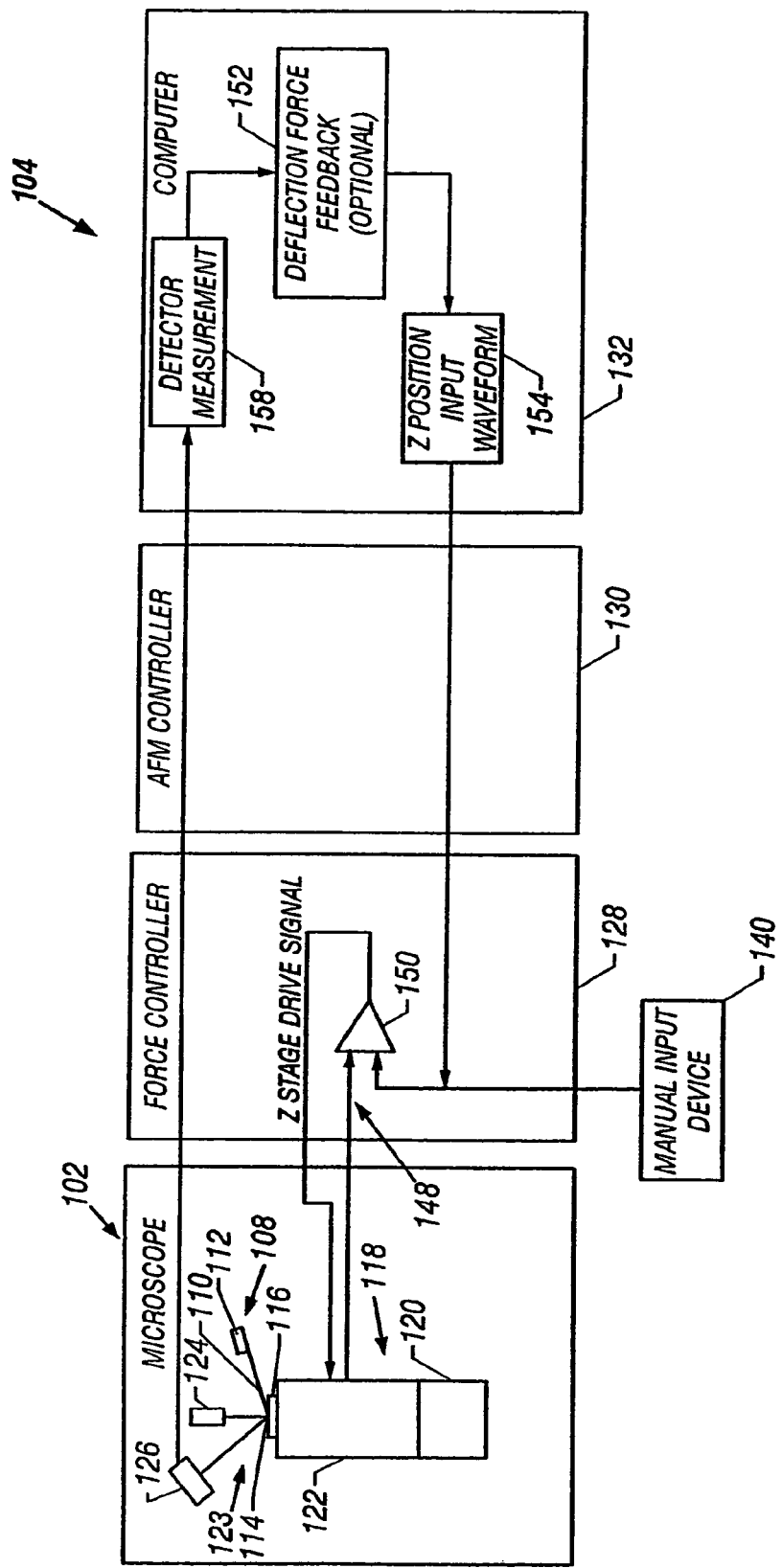
FIG. 7 is a diagram further illustrating the FSPM of the preferred embodiment, including a force mode controller feedback system.

Turning to FIG. 7, FSPM 100 is shown in further detail. In particular, the force feedback mechanism of the preferred embodiment is illustrated. Force controller 128 of data acquisition and control system 104 includes a Z position drive/feedback loop 148 including a closed-loop control block 150, preferably, conventional analog circuitry including a comparator and a gain stage (not shown), that generates a drive signal that controls piezoelectric flexured Z actuator 122 to maintain linear motion of Z actuator 122; in other words, motion corresponding to the desired Z motion as defined by the user input. Control block 150 generates Z-stage drive signal based on two inputs, a first being the actual Z motion measured by sensored Z actuator 122, and the second being the desired Z actuator motion transmitted automatically from computer 132 as a Z position input waveform 154 as detailed below, or manually from manual input device 140.

Figure 3:
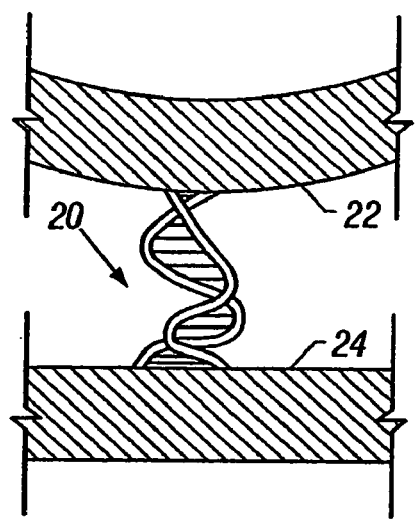
FIG. 3 is a partially broken away front elevation view of a DNA sample bonded between an AFM tip and a substrate.
Figure 4:
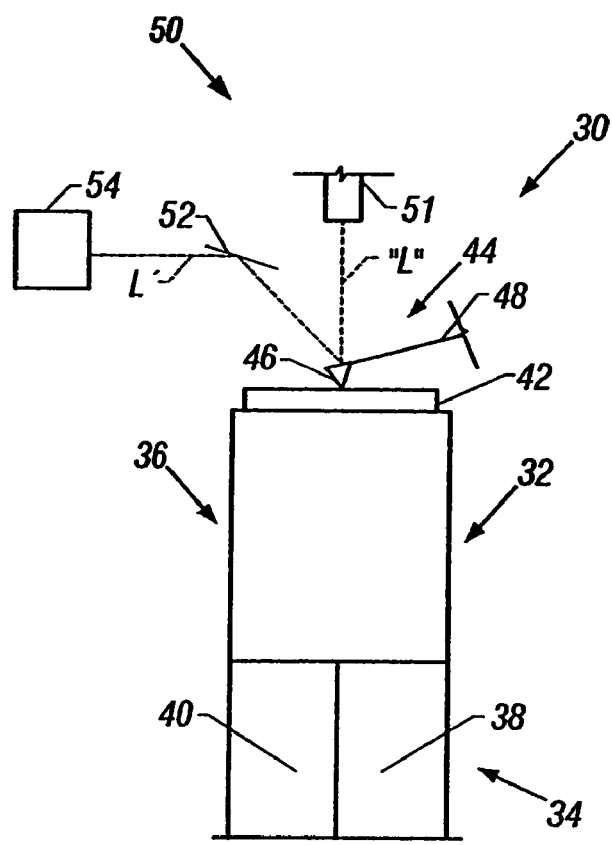
FIG. 4 is a front elevation view of a standard SPM including a conventional piezoelectric tube actuator.
Figure 5A:
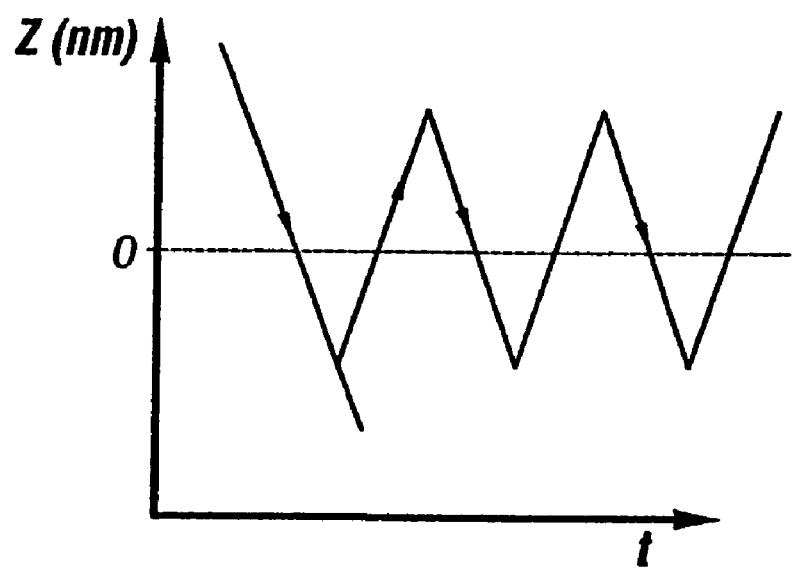
FIG. 5A is a plot illustrating a cyclical drive signal having a particular amplitude and speed for making a force curve measurement.
Figure 5B:
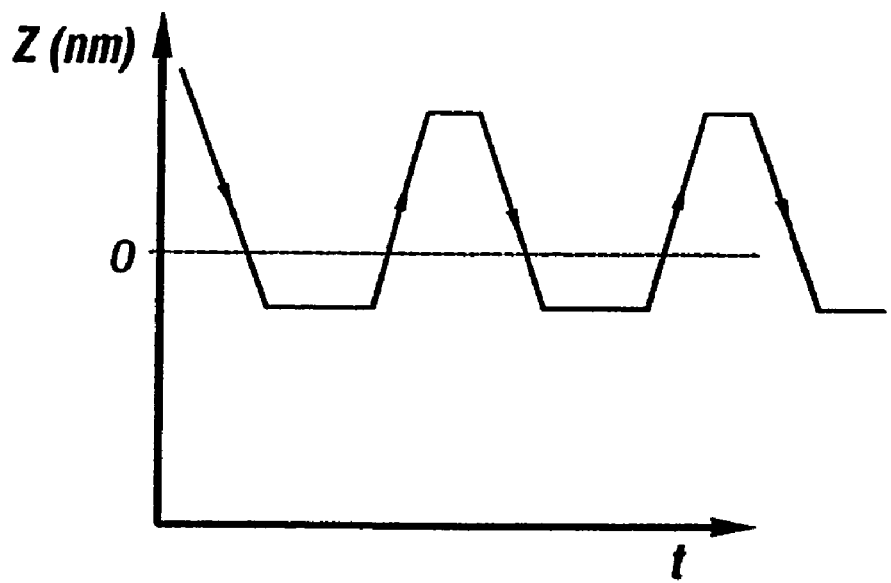
FIG. 5B is a plot similar to FIG. 5A illustrating a cyclical drive signal, characterized as including a pause between changes in the direction of actuation of the Z piezo.

With respect to the desired Z actuator motion, flexibility in making corresponding force curve measurements is achieved by controlling the tip-sample separation via Z actuator 122. This motion of Z actuator 122 can be defined by a standard input for making force curve measurements, such as a cyclic triangle wave, as described previously (FIG. 5A), or it could be a more complex user-defined input. For example, a deflection force feedback block 152 may be employed in conjunction with the Z position waveform 154 to maintain a particular force or force profile, or to change a force measurement parameter in response to a "trigger" condition, as shown and described in conjunction with FIGS. 14, 15A–C, 16 and 17. Alternatively, the Z position waveform block 154 can input an appropriate profile to computer 132 that can then be communicated to force controller 128 to define a predetermined Z position profile over time (FIGS. 12 and 13A–C). In yet another alternative, rather than automatically controlling Z actuator 122 to make selected force measurements, the desired actuator motion may be controlled manually during acquisition of force data by an operator via manual input device 140.

Referring to FIGS. 6 and 7, in operation, as tip-sample separation is modulated (in the preferred embodiment, by actuating Z actuator 122), probe 108 interacts with sample 116. As a result, the motion of cantilever 110 of probe 108 changes and this change in motion is detected by detector 126. Detector 126, as described previously, generates a probe motion signal (for example, if detector 126 is a split photodiode, the quantity (A−B)/(A+B) defines the deflection) that is transmitted to computer 132. Computer 132 includes a detector measurement circuit 158 that receives the deflection detection signal and, in response, determines the force acting on probe 108. Deflection force feedback block 152 of computer 132 then determines whether a particular force is being maintained (force profile input), or whether a trigger condition is satisfied. In response, feedback block 152 generates and transmits an appropriate control signal to force controller 128 (FIG. 6), which generates a Z-stage drive signal to control actuator 122 translation according to the user's specifications for that particular force measurement, i.e., to maintain or change the force measurement parameters, such as direction of Z motion, speed, etc., as described further below. Computer 132 may also include one or more Z-position input waveforms that may be selected by an operator (again, preferably via a GUI) to allow the user to flexibly control the actuation of the Z piezo according to a particular experiment to be performed (FIGS. 12 and 13A–C).

Figure 8:
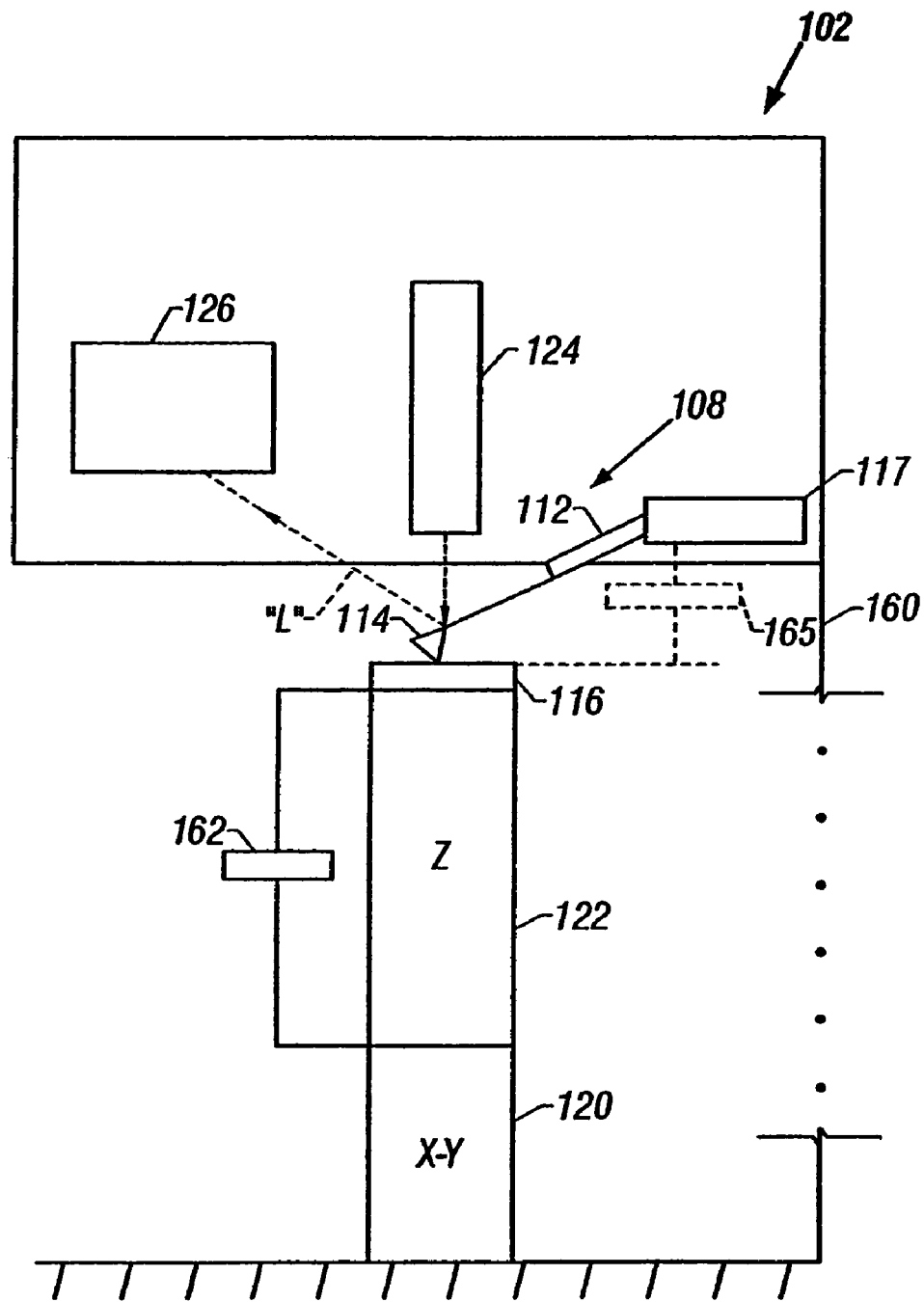
FIG. 8 is a side elevation view of the FSPM of the preferred embodiment, illustrating the Z sensor.

The position input to control block 150 input is the actual motion of Z actuator 122, as measured by a sensor (162 in FIG. 8). During a force measurement, the sensor measures the motion of Z actuator 122 and generates an associated Z actuator position signal that it transmits to control block 150 of force controller 128. Control block 150 then determines whether the actual translation of Z actuator 122 is the same as (i.e., linear with) the instructed Z actuated movement provided by either computer 132 or manual input device 140. If not, control block 150 generates an appropriate Z-stage drive signal to correct any Z translation that does not correspond to the user's input. In this way, precision in modulating the tip-sample separation is maintained.

In FIG. 8, the sensor feature aspect of scanner 118, and in particular Z actuator 122, is shown. SPM 102 of system 100 includes a chassis 160 to which the deflection detection system 123 and the probe assembly, including probe 108 and mount 117, are coupled. Chassis 160 also supports scanner 118, which is fixed thereto. Again, the X-Y translation of scanner 118 is provided by piezoelectric tube scanner 120, while the Z translation is provided by flexured piezoelectric actuator 122. To monitor the translation of Z actuator 122, a sensor 162 is preferably coupled to Z actuator 122. Ideally, sensor 162 is a capacitive sensor that measures the translation of the Z actuator 122 (and, hence, translation of the sample 116) by measuring the capacitance change caused by a change in the separation of the plates of the capacitor. Referring briefly to FIG. 10, one arrangement of the plates of capacitive displacement sensor 162 is shown. An upper plate 163 is fixed to a stationary portion of flexure stage 122, while a lower plate 164 is fixed to a translatable portion 168 of stage 122. As a result, when the Z actuator 122 is actuated, movement of translatable portion 168 (and thus sample 116) causes the perpendicular separation between plates 163, 164 to be modified. This change in separation is measured to determine actual Z translation causes a corresponding change in the measured capacitance. Notably, because the flexure stage from the Z actuator 122 is robust, the separation between plates 163, 164 along their surface areas remains constant (i.e., they maintain their parallel relationship) when Z actuator 122 is actuated. Moreover, although a parallel plate capacitor is preferred, sensor 162 could be an alternative type of sensor such as a piezo-resistive sensor mechanically coupled to a reference and the translatable portion of the piezoelectric Z-stage (i.e.—LVDT, or strain gauge sensors).

As noted above, inaccuracies in tip/sample positioning can arise due to residual mechanical effects such as hysteresis, creep, thermal expansion, etc. that can act on all or part of the AFM system. Because, in making force measurements, it is the tip-sample separation that is critical, an arrangement that eliminates or minimizes these effects was desired. In this regard, an alternative to the sensor arrangement described above, also shown in FIG. 8, includes coupling a total system proximity sensor 165, such as a capacitive sensor, between the sample and the probe itself to provide a direct measure of tip-sample separation. As a result, by measuring the actual tip-sample separation between sample 116 and tip 114 with sensor 165, position feedback loop 148 (FIG. 7) maintains a high degree of positioning accuracy. Such a total system proximity sensor 165 essentially eliminates the effects of hysteresis, creep, and thermal expansion because these effects occur with respect to the sample and probe assembly simultaneously. If the parallel plates of a capacitive sensor are coupled to the sample and probe assembly, respectively, these potentially damaging effects cancel each other out when tip-sample separation is measured.

Figure 9:
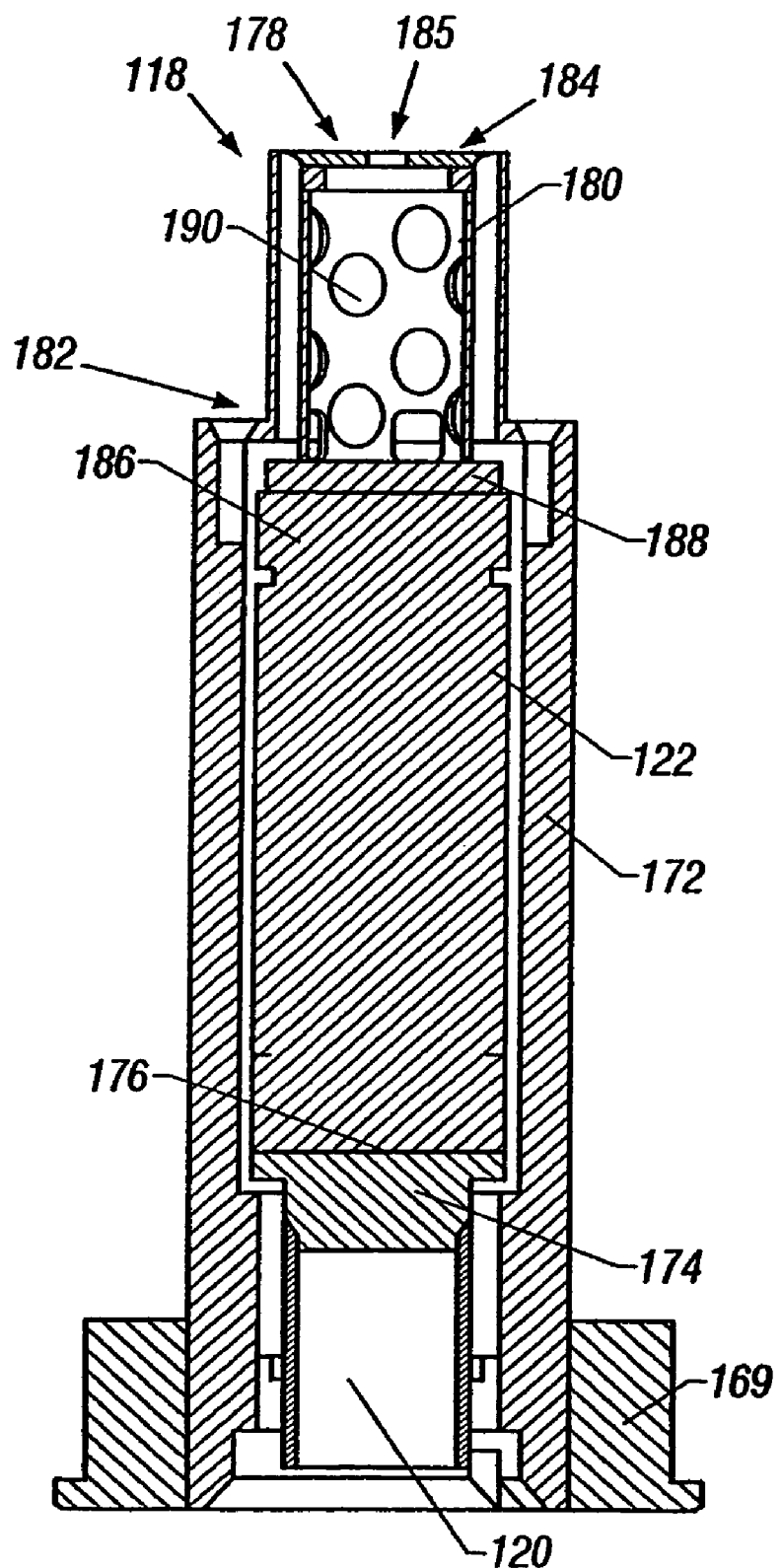
FIG. 9 is a cross-sectional front elevation view of the force spectroscopy scanner shown schematically in FIGS. 6, 7 and 8.

Next, a detailed view of force spectroscopy scanner 118 is shown in FIG. 9. Scanner 118 provides movement of a sample (116 in FIG. 6, for example) in three orthogonal directions, which we refer to hereinafter as movement in X, Y and Z. Note that scanner 118 operates to move sample 116 underneath probe 108 (FIG. 6), and that movement in X and Y defines a plane generally parallel to a surface of the sample. Again, although force measurements are made at a particular sample location (x,y), movement in the XY plane is required for analyzing different regions of the sample. By generating force curves at a variety of XY locations of the sample, a force volume image may then be generated, for example.

Scanner 118 includes a scanner mounting base 169 that is coupled to the chassis (160 in FIG. 8), and that serves as a reference for position measurements. A scanner core 172 extends upwardly from scanner mounting base 169 and is coupled thereto. Scanner core 172 defines a tubular structure that encloses and protects piezoelectric XY tube scanner 120, as well as flexured Z actuator 122. Scanner core 172 is preferably made of a metal, ideally a commercially available steel such as INVAR.

Z actuator 122 is coupled to XY tube scanner 120 via an XY-Z coupling 174. XY-Z coupling 174 is a cap that is positioned over the top of tube scanner 120 and that provides a mounting surface 176 for fixing flexured Z actuator 122 to XY tube scanner 120 conventionally. When the actuator 122 is assembled, axes passing through the center of each of the coupled scanner portions are generally collinear.

In this arrangement, translation of XY tube scanner 120 causes corresponding movement of flexured Z actuator 122. Notably, by positioning tube scanner 120 beneath Z actuator 122 the X-Y movement produced by tube scanner 120 is amplified at a free end 178 of scanner 118.

Notably, a conventional piezoelectric tube scanner, such as scanner 120 employed in the preferred embodiment, provides a limited range of motion, such that the scan range (i.e., in the XY plane) provided by scanner 118 alone is less than ideal. However, in the preferred design shown in FIG. 6 (and in more detail in FIG. 9), greater XY scan range is achieved due to the fact that the object being moved by scanner 118 is displaced from tube scanner 120 a distance generally equal to the length of sensed Z actuator 122, which is supported by tube scanner 120. In other words, scanner 118 mechanically amplifies the XY range afforded by scanner 118.

It follows that the larger distance between tube 120 and the object being moved, in this case a sample placed at the free-end 178 of scanner 118, the larger the amplification. In this regard, to further amplify movement of free end 178 of the scanner 118 produced by the XY tube scanner, a cylindrical Z extension 180 can be included, as shown in FIG. 9. Z extension 180 has opposed ends including a first end 182 which is fixed to a top portion 186 of Z actuator 122 via a mounting flange or ring 188, and a second end 184 that is configured to support a sample holder 185. As with the X-Y tube scanner 120 and Z actuator stage 122, Z extension has a central axis collinear with the central axis of scanner 118. The sample holder is conventional in the art, such as that shown in U.S. Pat. No. Re 34,485. As with piezoelectric Z actuator 122, Z extension 180 is preferably made of INVAR. To minimize the mass of extension 180, and thus prevent compromising the strength of scanner 118, a plurality of holes 190 are formed therein.

Figure 10:
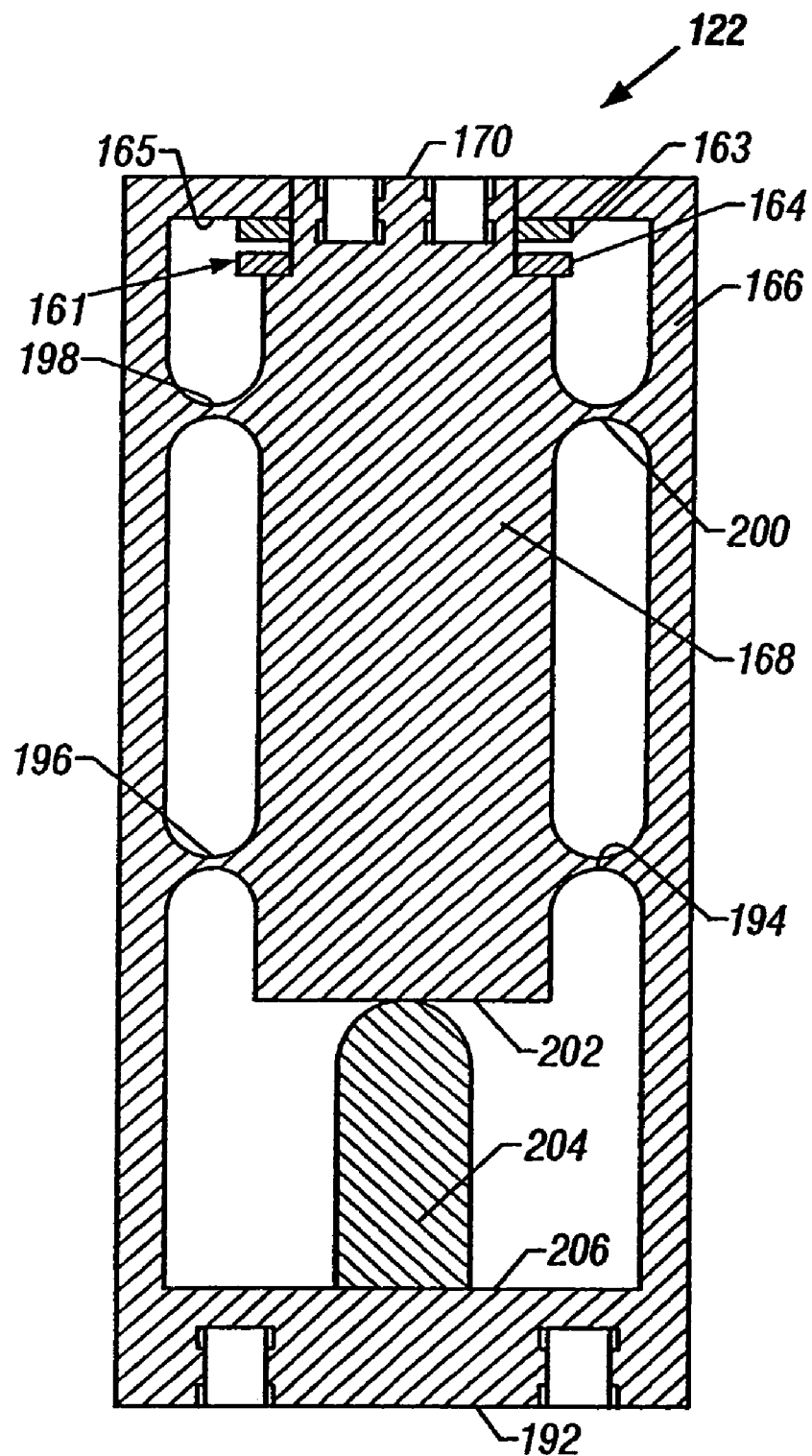
FIG. 10 is a cross-sectional schematic view of a typical sensored Z stage preferably implemented in the scanner of FIG. 9.

In FIG. 10, a typical flexured Z actuator stage 122 of force spectroscopy scanner 118, which is adapted for providing Z position feedback as described previously, is shown schematically. Z actuator 122 includes a mounting surface 192 that is coupled to X-Y tube scanner 120 as shown in FIG. 9 with XY-Z coupling 174. Z actuator 122 is preferably a metal block (e.g., Invar) having portions thereof removed to create a fixed section or frame 166 and a translatable section 168 coupled to provide constrained motion in Z, i.e., in a direction perpendicular to surface 120. Linking fixed and translatable portions 166, 168, respectively, are weakened points that permit movement of the metal mass when forces are applied thereto. In particular, the metal block includes a series of flexure points 194, 196, 198, 200 formed to constrain motion of translatable portion 168 in a plane orthogonal to the vertical or Z direction (i.e., in the XY plane), while allowing motion of portion 168 in the vertical direction.

More particularly, each of the flexure points 194, 196, 198, 200 comprises a web of metal that can "flex" to allow a sample (116 in FIG. 6) mounted on a translating/mounting surface 170 of translatable portion 168 to be translated in a direction orthogonal to mounting surface 170. Again, flexure points 194, 196, 198, 200 are coupled to fixed portion 166 and support center translatable section 168 of scanner 118.

Translatable section 168 defines mounting surface 170 and also defines a lower contact surface 202 that interfaces with, preferably, a piezo stack 204 mounted within Z actuator intermediate a surface 206 of fixed portion 166 and contact surface 202. Piezo stack 204 is a conventional piezoelectric component that produces motion in a selected direction in response to appropriate voltages applied to electrodes placed on the piezoelectric material of piezo stack 204. Piezo stack 204 expands and contracts in response to the applied voltage signals such that the mechanical motion is transferred to center section 168 of Z actuator 122 via surface 202. Section 168, in turn, moves vertically as flexure points 194, 196, 198, 200 flex. In this case, piezo stack 204 is configured to move in a direction substantially orthogonal to mounting surface 120 in response to the control voltages.

As noted above, to measure the motion in Z provided by actuator 122, first plate 164 of capacitive displacement sensor is fixed to translatable section 168 of Z actuator 122, while opposed plate 163 is mounted to a surface 165 of fixed portion 166 of Z actuator 122. As a result, movement of translatable section 168 relative to fixed portion 166 can be precisely measured as a change in capacitance due to a change in the perpendicular separation "D" of plates 163, 164 of capacitive displacement sensor 161. More particularly, capacitance is proportional to one over the separation distance, i.e., $C=\epsilon A/D$, where "D" is the perpendicular distance between the parallel plates, thus providing a measure of Z translation. Notably, plates 162, 164 of sensor 161 preferably are rings.

In operation, a displacement signal is generated by sensor 161 and fed back to Z position feedback loop 148 (FIG. 7) to determine whether the voltage applied to piezo stack 204 resulted in the intended motion. If not, one or more a correction Z-stage drive signals can be generated to provide the intended motion of sample 116. Again, this aspect of the preferred embodiment allows precise control of the scanner which is critical to achieving flexibility in making force measurements, to be described below.

Notably, flexured Z actuator 122 shown in FIG. 10, is configured according to the schematic shown in FIG. 8. However, as noted above, when a sample coupled to surface 170 is translated in the vertical direction, effects due to non-linearity, hysteresis, creep, drift, etc., can contribute to the Z motion provided by actuator 122, thus causing positioning/spacing problems. Therefore, a sensor arrangement as shown in phantom in FIG. 8 may be preferred for measuring actual Z motion under certain environmental conditions, conducting particular experiments, etc.

Scanner 118 also provides a high resonant frequency, three-dimensional actuator that achieves optimum performance in x,y scan range and true Z motion in a small package. In the latter regard, the height of sensored Z actuator 122 is approximately 2" such that once the actuator 122 is coupled with piezoelectric XY tube scanner 120, scanner 118 is maintained in approximately the same package as a conventional XY-Z tube scanner.

Overall, scanner 118 produces large Z position range, with substantial X-Y range, while being contained in a small package. Moreover, scanner 118 is readily adapted for Z sensing. As a result, scanner 118 is adapted to provide closed loop monitoring of tip-sample separation, while minimizing noise problems and having a high resonant frequency with respect to Z positioning (mechanical flexure driven by piezo versus a simple piezo stack or tube), which is particularly important when making force measurements.

Figure 11A:
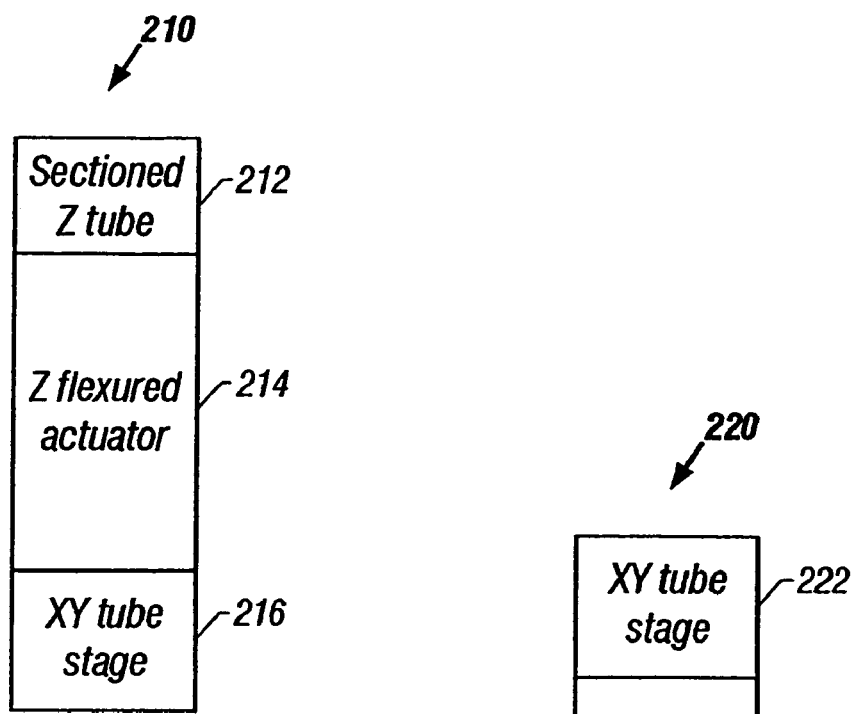
FIGS. 11A–11C illustrate alternate embodiments of the configuration of the scanner of the FSPM of FIGS. 6–10.
Figure 11B:
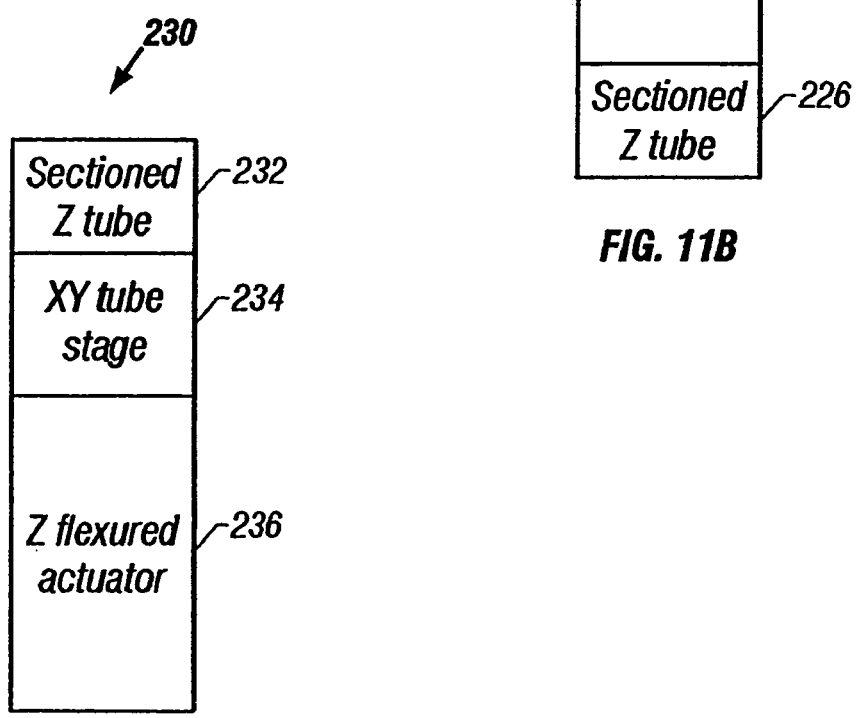
Figure 11C:
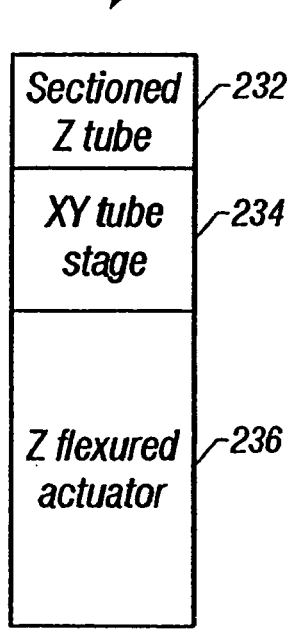

Next, alternative configurations of force spectroscopy scanner 118 are shown in FIGS. 11A–11C. In FIG. 11A, a scanner 210 includes a sectioned Z actuator (tube or stack) 212 that is disposed on top of a flexured Z actuator 214 which, in turn, is mounted on an XY tube 216. Because XY tube 216 is arranged at the bottom of scanner 210, a relatively wide range of XY scanning capability is achieved, for reasons described previously. Z tube 212 is adapted to accommodate a sample (not shown) and provides motion generally orthogonal to a surface of the sample to modulate tip-sample separation according to the user's requirements. In this arrangement, flexured Z actuator 214 may provide coarse adjustment of tip-sample separation, while Z tube 212 can be implemented to provide a fine adjust of the tip-sample separation, i.e., movement of the sample. This may be particularly desirable when working with delicate samples. Or, Z tube could be driven by a high frequency oscillation to accommodate different modes of operation such as a mode similar to that described in the literature as "fly-fishing" in which the tip is oscillated at a relatively small amplitude and relatively high frequency (via acoustic or magnetic "AC" or TappingMode) while the tip-sample separation is reduced, with the desired result being that the probe "snags" or "catches" a single molecule on the surface. The addition of a second Z axis piezo would allow a similar technique where the user can instead use the second piezo to provide the low amplitude/high frequency oscillation.

In the alternative shown in FIG. 11B, scanner 220 includes a flexured Z actuator 224 that is positioned intermediate a sectioned piezoelectric Z tube 226 and a piezoelectric XY tube 222 on which the sample resides. Unlike the previous cases, in this arrangement, the Z actuators 224, 226 move the XY tube actuator 222. Therefore, scanner 220 provides the flexibility of the scanner shown in FIG. 11A. However, XY range of scanner is compromised, as it is disposed nearest the object to be translated, i.e., the sample. Finally, as shown in FIG. 11 C, a similar arrangement of a flexured Z actuator 236, an XY tube actuator 234, and a sectioned Z tube actuator 232 is shown. In this case, flexured Z actuator 236 is fixed to the SPM chassis to provide an actuator having superior strength to the previous embodiments. Moreover, XY scanning range is larger than scanning range of actuator 220 in FIG. 11B due to the fact that the perpendicular distance between the XY tube scanner 234 and the sample (disposed on the sectioned Z tube actuator) is larger. In each of the alternative configurations in FIGS. 11A–11C, to best determine tip-sample separation, the preferred Z sensing method includes utilizing sensor 165 shown in phantom in FIG. 8, where a direct measure of separation is made.

By utilizing the sensors of the preferred embodiment, FSPM 100 precisely controls the Z movement of the actuator 118, monitoring whether the Z movement is in the intended direction, such that significant flexibility in making force curve measurements can be achieved. In particular, according to a further aspect of the preferred embodiment as shown in FIGS. 12–17, methods are disclosed for altering a force measurement parameter based on a selected user-defined input.

Figure 12:
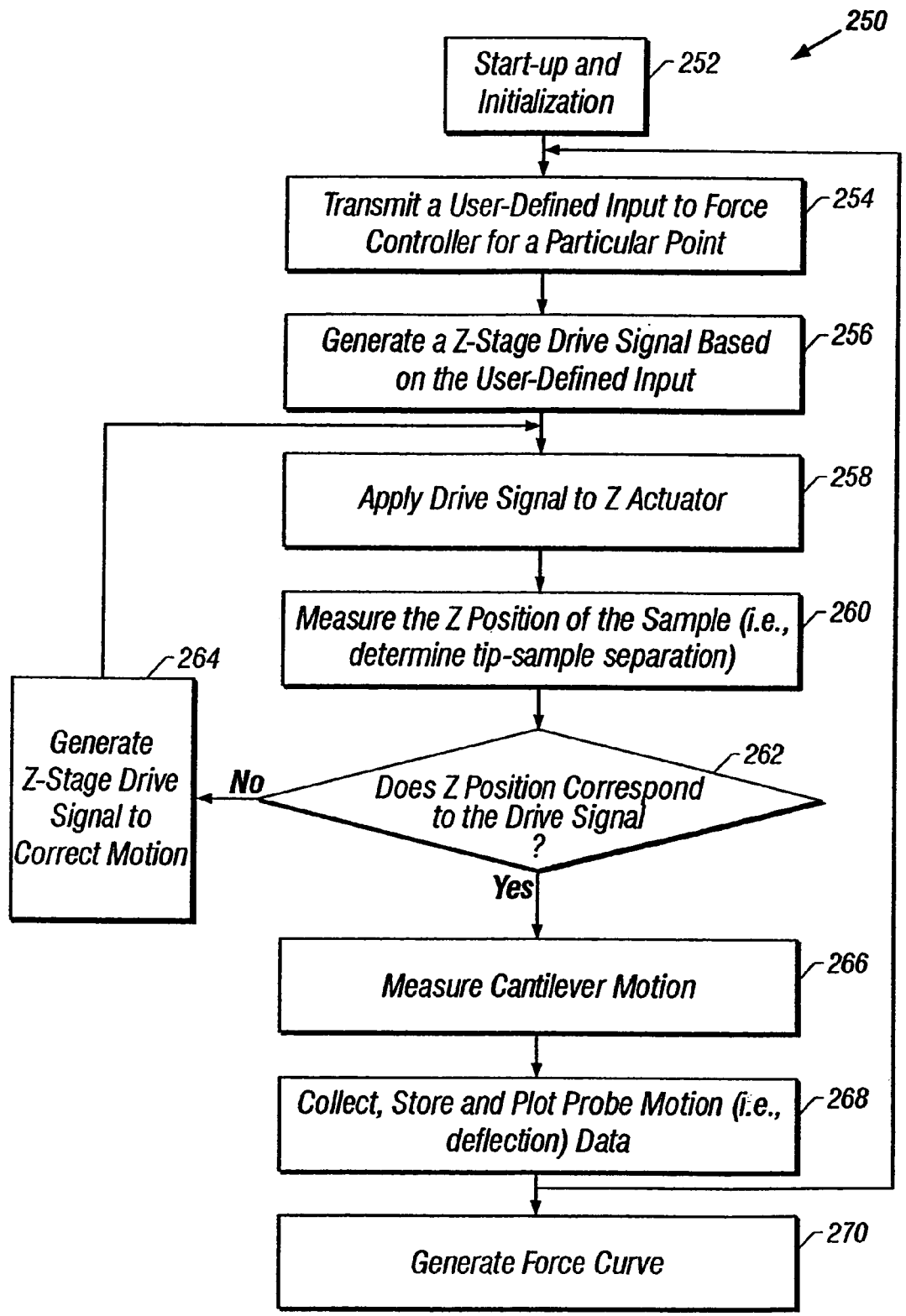
FIG. 12 is a flow diagram illustrating a method of automatically effecting a force curve measurement with a selected position gradient.

Turning initially to FIG. 12, a method 250 of making a force curve measurement by driving the tip-sample modulation with a tip-sample separation gradient includes, initially, a start-up and initialization Block 252. Next, in Block 254, a signal corresponding to a first point of a defined input (in this case, a tip-sample separation gradient) is transmitted to the force controller (128 in FIG. 7). Then, method 250 generates a drive signal based on the tip-sample separation gradient for that point in Block 256. This drive signal is then applied, in Block 258, to the scanner (118 in FIG. 6).

Method 250 then measures the Z position of the sample in Block 260 (FIG. 8). Next, in Block 262, the method determines whether the movement in Z corresponds to the user-defined input (i.e., closed-loop Z-positioning). If not, a new drive signal is generated to correct the Z motion in Block 264 and method 250 is returned to Block 258 to apply the new drive signal to the scanner. If, on the other hand, movement corresponds to the user-defined input, cantilever deflection is measured in Block 266. This data is collected and stored in Block 268 and then plotted as a force versus time curve for that point. Method 250 then returns operation to Block 254 to transmit a signal corresponding to the user-defined input for the next point of the position gradient. By combining the position gradient and the force gradient (Block 258) a force versus separation profile, i.e., a force curve is generated in Block 270.

Figure 13A:
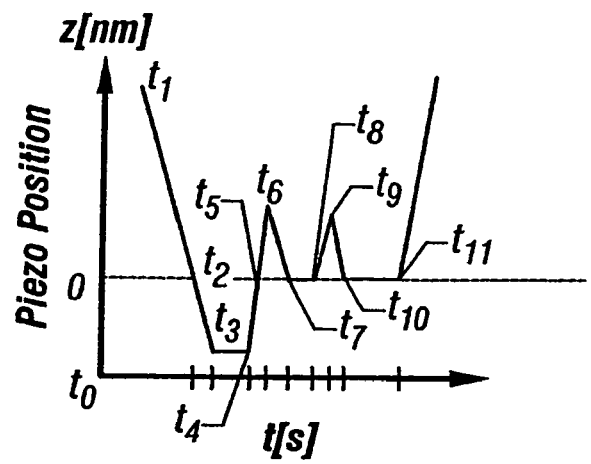
FIG. 13A is a plot illustrating a user-defined tip-sample separation gradient used to drive the Z piezo.
Figure 13B:
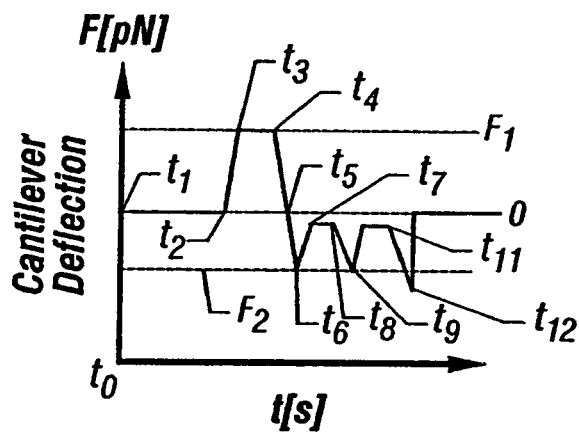
FIG. 13B is a plot illustrating a force versus time curve associated with actuating the Z piezo as shown in FIG. 13A.
Figure 13C:
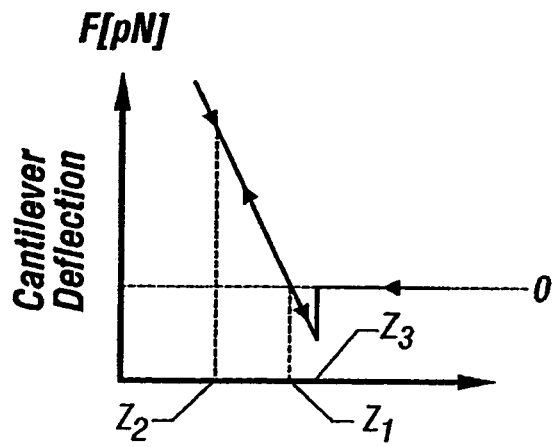
FIG. 13C is a force curve generated by combining the position and cantilevered deflection time dependent plots shown in FIGS. 13A and 13B, respectively.

An example of method 250 in operation is shown in FIGS. 13A–13C. The waveform shown in FIG. 13A corresponds to user-defined input of Block 254. And, the corresponding forces between the AFM probe tip and the sample generated as a result of this position profile are measured and plotted in FIG. 13B (Block 268). Notably, the velocity of this actuation is defined by the slope of the separation curve. Moreover, note that the zero ("0") piezo position corresponds to zero tip-sample separation, and that negative slope indicates movements upwardly, i.e., towards the probe as an increasing negative Z-position. A piezo position at or below "0" indicates no separation as sample engages the AFM tip and continues to move, potentially causing the cantilever to deflect while in contact with the sample. In that case, the tip of the probe may or may not be penetrating the sample, as may be indicated by the measured forces (FIG. 13B). On the other hand, as the Z-piezo moves the sample downwardly (positive slope in FIG. 13A), tip-sample separation is increasing. However, as the Z-piezo is withdrawn past the zero position (initial tip-sample contact), the sample may bind to the tip such that there is zero actual tip-sample separation for a time as the cantilever deflects to follow the downward motion of the sample.

Referring collectively to FIGS. 13A and 13B, as the sample approaches the tip of the cantilever starting at time $t_1$, the tip experiences a force (FIG. 13B) at about $t_2$ where the cantilever begins to deflect upwardly, which is correspondingly sensed by the deflection detection system (see 123 in FIG. 6). The flexured Z actuator 122 (FIGS. 6–11) is then caused to translate further in the same direction, i.e., towards the fixed probe, and at the same velocity (constant slope). This movement of the flexured Z actuator is halted at a time $t_3$ where the probe experiences a positive deflection or force $F_1$ as shown in FIG. 13B. After holding the Z position constant for a period of time $t_4$ minus $t_3$ (for example, to allow binding of a molecule to the tip), the direction of movement of the flexured Z actuator is reversed as the sample is pulled away from the tip. In this case, the positive deflection of the cantilever is reduced as it passes through the zero piezo position (time $t_5$) where the tip is essentially resting on the sample as the Z actuator pulls the sample further away from the probe. As this actuation continues, binding between the tip of the probe and the sample produces a negative deflection and a corresponding negative force that increases to a value $F_2$ (FIG. 13B), as Z translation continues until a time $t_6$. Notably, if there was no binding of the sample to the tip, the actual separation between the sample and the tip would be non-zero.

At time $t_6$, this negative deflection of the probe decreases as the direction of translation of Z motion is reversed, such that the deflection of the cantilever of the probe again approaches zero. In this case, in the case of a titin molecule, the molecule is allowed to "refold," as Z actuator again moves in a direction towards the microscope tip. The corresponding measured forces are indicative of sample properties. This approach/withdraw cycle is repeated until the piezo is translated away from the probe at a constant velocity at time $t_{11}$. As a result, the Z actuator moves the piezo until the tip releases from the sample, at which time $t_{12}$ the force plotted in FIG. 13B returns to zero, i.e., as the cantilever of the probe returns to its free-air deflection.

Thereafter, the position gradient shown in FIG. 13A and the corresponding force data measured as a function of time (FIG. 13B), which again is measured in response to the selected tip-sample separation gradient shown in FIG. 13A, are combined in conventional fashion to produce the force versus separation curve shown in FIG. 13C. In sum, by controlling the Z actuator position relative to the fixed probe, different properties of the sample supported by the flexured actuator can be observed and recorded according to the user's requirements. For example, in one experiment, forces measured during the stretching and refolding of particular molecules, such as titin molecules, can be analyzed according to particular models of their mechanical behavior.

FIG. 13C illustrates a force curve similar to that shown in FIG. 2. Note that the bi-directional arrows on the force curve indicate approach (decreasing "piezo Z", i.e., decreasing tip-sample separation) and retract (increasing "piezo Z"). As the sample approaches the cantilever tip, zero force is experienced by the tip such that no deflection of the cantilever is detected. As the tip begins to interact with the sample at position $z_1$ (generally corresponding to time $t_2$ in FIGS. 13A and 13B) the cantilever begins to deflect upwardly. This deflection is plotted as a positive force. As the sample is translated further towards the tip, the cantilever of the probe deflects further, thus increasing the force detected. As the tip continues to interact with the sample, the actuator position reaches a point $z_2$ where the direction of the movement is changed. In particular, the sample is pulled away from the tip, thus causing the measured force to decrease until it reaches a point $z_1$ where the probe experiences zero force once again.

As the sample is withdrawn further from this zero force position, because in this case the tip binds to the sample, the sample begins to "pull" the probe downwardly as the force continues to increase in the opposite direction. Thereafter, the tip releases from the sample at $z_3$, such that the probe deflection returns to its free-air zero value.

Figure 14:
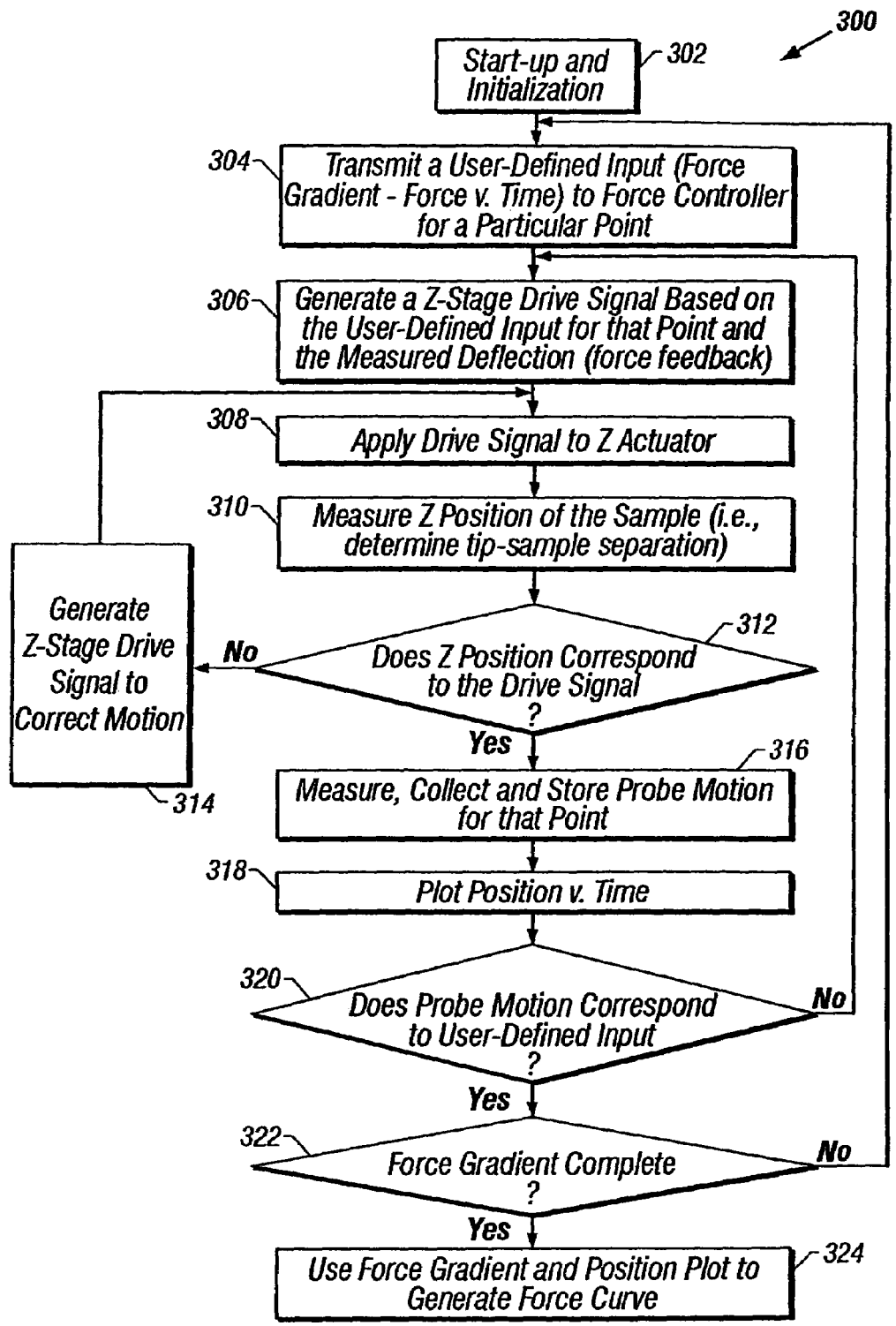
FIG. 14 is a flow diagram illustrating a method of driving a force curve measurement with a selected force gradient.

Another user-defined profile is illustrated in FIG. 14 as a method 300 for controlling one or more force measurement parameters according to a user-defined force gradient. The method 300 is also illustrated graphically with an example in FIGS. 15A, 15B and 15C. After a start-up and initialization Block 302, method 300 transmits a user-defined force gradient signal for a particular point of the gradient to the force controller (128 in FIG. 7) in Block 304. Next, in Block 306, the force controller generates a drive signal based on the user-defined force gradient for that point (e.g., selecting a velocity, direction and duration of Z actuation), and then applies the drive signal to the Z actuator in Block 308. As the drive signal is applied, the Z position of the scanner is measured in Block 310 (closed-loop Z-positioning), and method 300 determines whether the movement corresponds to that dictated by the drive signal in Block 312. If not, a drive signal is generated in Block 314 to correct the Z motion. If so, the deflection of the cantilever is measured, collected and stored to determine the force on the cantilever in Block 316.

Method 300 next plots position on a position versus time plot for that point in Block 318. In Block 320, method 300 determines whether the force on the cantilever corresponds to the user-defined force input (FIG. 15A, for example, described below) for the particular point defined in Block 304. If the force correspondence requirement is not met, the process is returned to Block 306 to generate a new Z-stage drive signal based on the user-defined input and the measured deflection (instruction generated and communicated from deflection force feedback block 150 in FIG. 7). For example, if the measured force is less than the desired force, a signal is transmitted to the force controller to instruct the force controller to transmit an appropriate signal to the Z actuator to move the sample faster so that the correct cantilever deflection (i.e., force) for that point is achieved. If, on the other hand, the force is met, method 300 asks whether each point in the force gradient has been considered in Block 322. If not, the process returns to Block 304 to transmit a force control signal for another point of the force gradient. If data has been obtained for each point in the force gradient, the collected and stored data (including the force gradient and position plot) are combined and plotted as a force versus a position profile of the sample (i.e., the force curve) in Block 324.

Figure 15A:
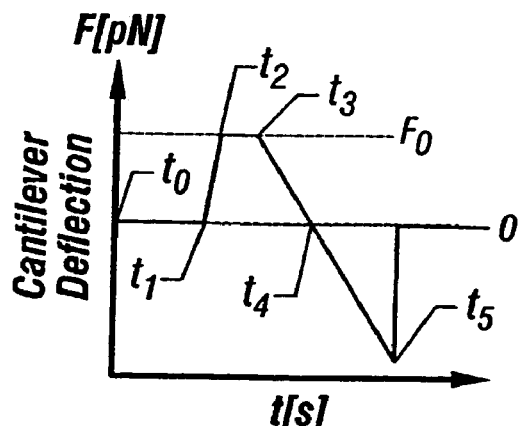
FIG. 15A is a plot illustrating a user-defined force gradient used to control the actuation of the Z piezo.
Figure 15B:
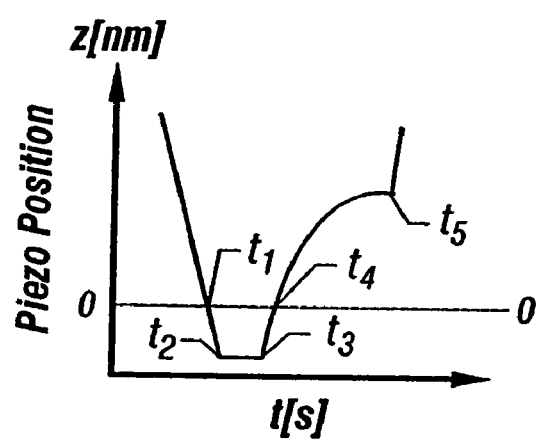
FIG. 15B is a plot illustrating a Z piezo position profile that results from the force gradient input shown in FIG. 15A.
Figure 15C:
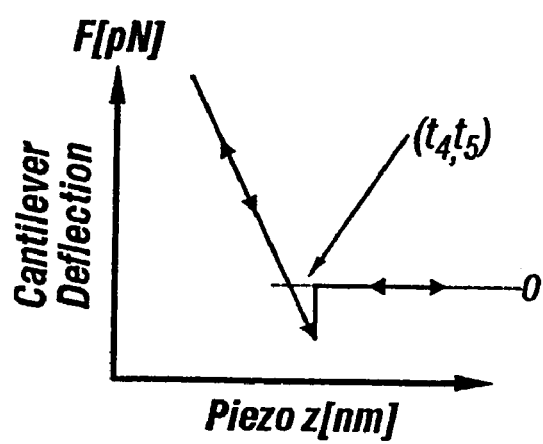
FIG. 15C is a force curve generated by combining the time dependent curves shown in FIGS. 15A and 15B.

An illustrative example of method 300 in operation is shown in FIGS. 15A–15C, defining another type of user-defined waveform input to control the acquisition of a force curve. Again, method 300 is directed to inputting a force gradient (FIG. 15A) (i.e., a rate of change of force) and measuring the corresponding position of the piezo required to achieve that force gradient (FIG. 15B). More particularly, with reference to FIG. 15A, between time $t_0$ and time $t_1$, the force is held constant at a zero value which typically will correspond to bringing the tip and sample into contact, as shown in FIG. 15B for this time range. At time $t_1$ the force gradient in FIG. 15A instructs the Z piezo actuator to move so that the force increases linearly from time $t_1$ to time $t_2$. Notably, as shown in FIG. 15B, at $t_1$ the cantilever deflection is zero and the piezo position is at zero tip-sample separation. Then, the cantilever deflects upwardly during the time $t_2$ minus $t_1$ as the actuator moves further towards the probe with the tip in contact with the sample. Between $t_2$ and $t_3$, the force is held constant, and thus the force controller does not cause the Z actuator to move.

At $t_3$, the method 300 instructs the Z actuator to move the sample so that the force is reduced linearly. At the time $t_4$, the force is zero while force controller continues to cause the Z actuator to pull the sample away from the microscope tip. Then, between $t_4$ and $t_5$, a linear force gradient in the same direction provides the instructions to the force controller for actuating the flexured piezoelectric Z actuator. It is notable that the actuation of the Z actuator required to maintain the linear force gradient shown between $t_4$ and $t_5$ in FIG. 15A, is nonlinear as shown in FIG. 15B. In other words, force is not directly proportional to tip-sample separation. As a result, including such a force gradient can provide useful information that cannot be obtained by using the tip-sample separation gradient shown in FIGS. 13A–13C. Finally, as the linear force gradient is continuously applied, the Z-stage drive to the Z piezoelectric actuator continues to pull the sample away from the tip until point $t_5$ at which time the tip releases from the sample surface and the force on the probe returns to zero. As in FIGS. 13A–13C, the time dependent curve shown in FIGS. 15A and 15B can be combined to produce the force versus separation curve shown in FIG. 15C. A notable region of the force curve of FIG. 15C is between the times $t_4$ and $t_5$ (labeled ($t_4$, $t_5$)) illustrating the binding of the tip to the sample as the Z-piezo is moved away from the probe. Although the force versus separation curves shown in FIGS. 13C and 15C are similar, the information provided in the measured curves in FIGS. 13B and 15B can each provide unique, valuable information regarding the particular experiment being conducted.

Next, trigger operation of the force SPM is very similar to the user-defined force gradient shown in FIGS. 13A–13C. However, rather than being predetermined as is the case with the user-defined force gradient, trigger-based operation can alter the force gradient, real-time, in response to a particular condition.

Figure 16:
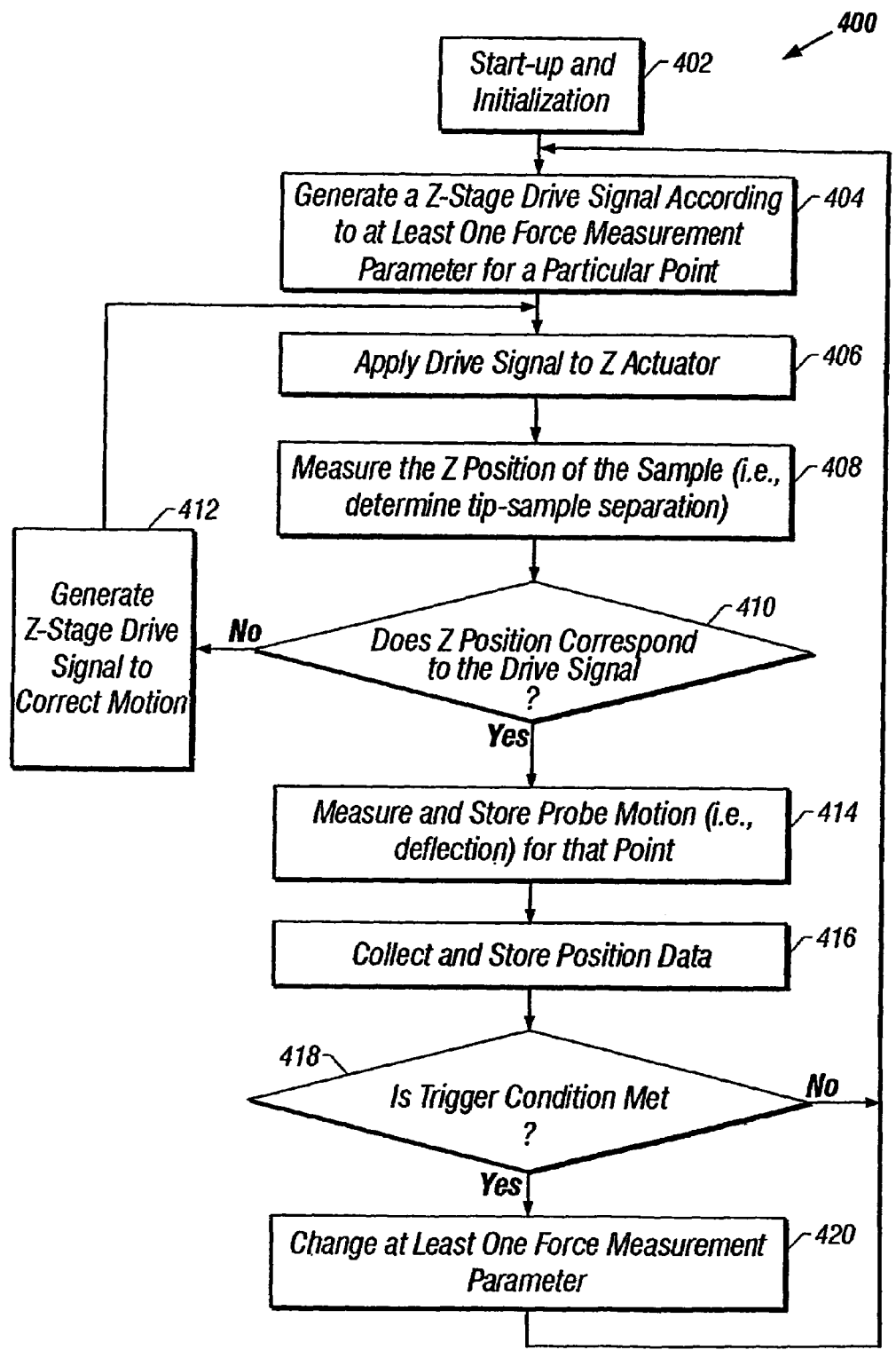
FIG. 16 is a flow diagram illustrating a method of automatically driving a force curve measurement according to one or more trigger conditions.

Referring initially to FIG. 16, a method 400 of trigger operation includes a start-up and initialization Block 402. Next, the Z-stage drive signal is generated according to at least one force measurement parameter for a particular point (e.g., a particular point in time on the trigger profile such as that shown in FIG. 17), in Block 404. Next, the Z-stage drive signal is applied to Z actuator to move the actuator for a particular amount of time, and in a selected direction and speed in Block 406. Next, in Block 408, method 400 measures the Z position of the sample to determine tip-sample separation. As part of the closed-loop positioning, in Block 410, method 400 determines whether the Z position corresponds to the drive signal. If it does not, method 400 generates a new Z-stage drive signal to correct Z motion so it corresponds to the intended motion defined by Block 404. If, on the other hand, Z position corresponds to the drive signal, the cantilever deflection for that point is measured and stored in Block 414. Next, in Block 416, method 400 collects and stores the corresponding position data.

Continuing, method 400 next determines whether a trigger condition has been met. If not, the process returns to Block 404 to generate another Z-stage drive signal for another particular point, i.e., the next point in time. If, on the other hand, the trigger condition is met, method 400 changes at least one force measurement parameter of the force curve acquisition process in Block 420. Once all trigger conditions of the trigger profile (for example, FIG. 17) have been met, method 400 is terminated and a position versus time plot is combined with the trigger profile to generate a force curve.

Figure 17:
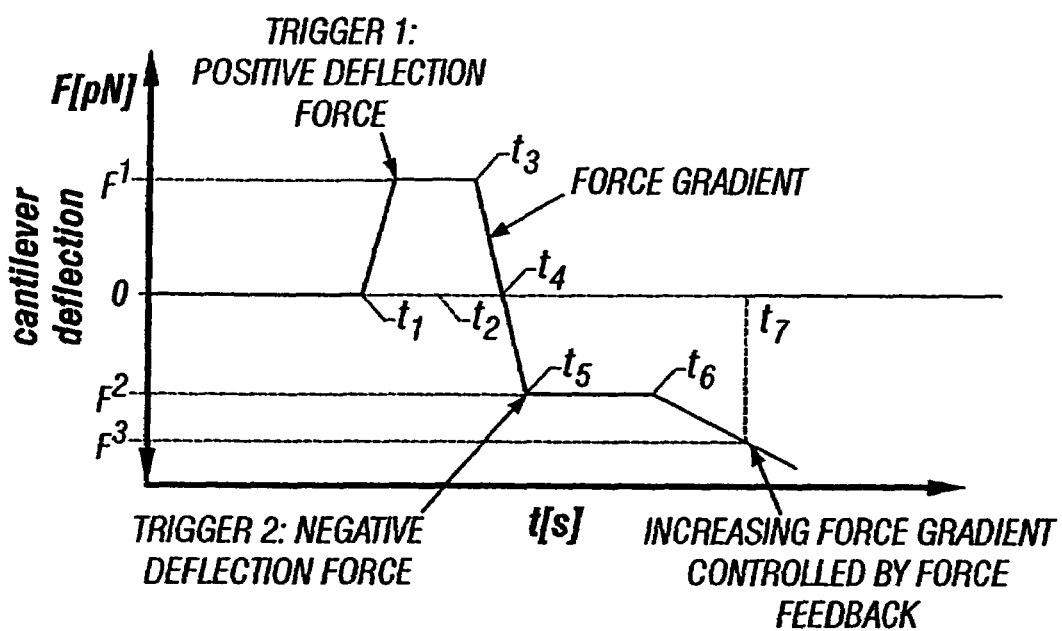
FIG. 17 is a plot illustrating trigger events that cause a change in the drive signal during a force measurement operation, according to the preferred embodiment.

Turning to FIG. 17, a force versus time curve generated according to the method 400 illustrated in FIG. 16 is shown. More particularly, as the computer instructs force controller to generate a Z-stage drive signal, the sample approaches the tip of the probe of the AFM and zero force on the probe is measured by the deflection detection system. Thereafter, as the tip begins to interact with the sample (e.g., a molecule) at time $t_1$, the force increases linearly to a value $F_1$ (positive deflection force) as the force spectroscopy actuator narrows the tip-sample separation.

At time $t_2$, a first trigger condition (a predetermined force) is met at a positive deflection force equal to $F_1$. In response, tip-sample separation is kept at the $t_2$ value for a time period $t_3$ minus $t_2$ (for example, to allow time for the tip to bind to the sample). At $t_3$, based on the first trigger, the computer transmits a signal to the force spectroscopy scanner to begin withdrawing the sample from the tip to increase tip-sample separation. At $t_4$, the tip of probe of FSPM is resting on the sample surface such that there is no deflection of the cantilever of the probe measured. As the separation is increased further, a linear force gradient is measured during a time $t_5$ minus $t_3$ as the tip passes through the zero force point at $t_4$. At that point, upon detection of the negative deflection force at $t_5$, Z movement of the force spectroscopy scanner is halted for a period of time equal to $t_6$ minus $t_5$ At $t_6$, computer instructs force controller to continue to "pull" on the sample based on the second trigger at a particular velocity to produce the force gradient shown in region "A". Tip-sample binding deflects the cantilever downwardly, and these forces are measured between times $t_6$ and $t_7$, producing as described previously until the tip separates from the sample at $t_7$ and the force between the tip and sample is again returned to zero as the tip is no longer interacting with the sample.

Figure 18A:
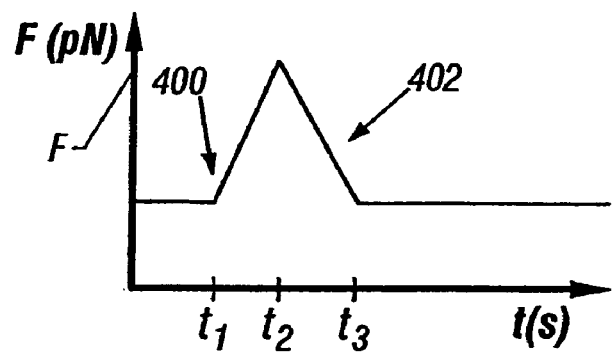
FIG. 18A is a plot illustrating an example of a force gradient such as that shown in FIG. 15A.
Figure 18B:
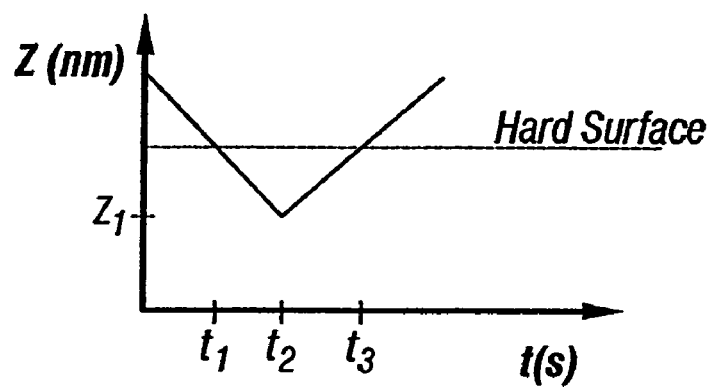
FIG. 18B is a plot illustrating the Z piezo movement that results by inputting the user-defined force gradient shown in FIG. 18A for a hard surface.
Figure 18C:
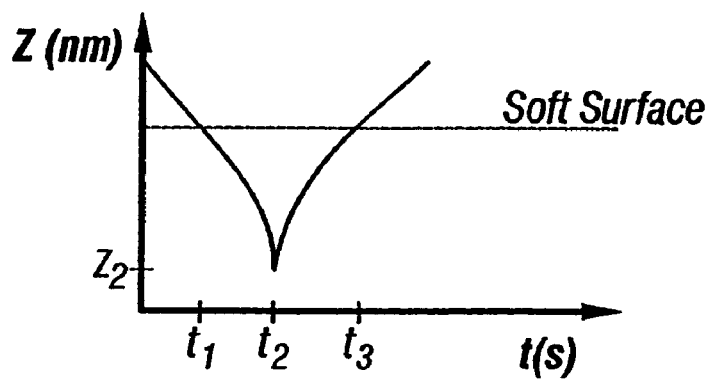
FIG. 18C is a plot illustrating the Z piezo movement that results by inputting the user-defined force gradient shown in FIG. 18A for a soft surface.

A straightforward example of using a force gradient to determine a sample property is illustrated in FIGS. 18A–18C. FIG. 18A defines a force gradient that is used to control the Z actuator similar to that shown in FIG. 15A. For a hard surface, illustrated with the Z position profile in FIG. 15B, the Z actuator is caused to move in a generally linear fashion both on the approach 450 (zero then increasing force) and retract 452 of the tip-sample separation. More particularly, to follow the force profile shown in FIG. 18A, the actuator moves linearly until a time $t_1$ defining a zero position where the tip begins to contact the sample, at which the time the force on the tip begins to increase. In the region from $t_1$ to $t_2$ the force gradient increases linearly (FIG. 15A) and the actuation of the Z actuator moves linearly as well (FIG. 15B) as the tip presses against the hard surface. At the peak force $F_1$ (at time $t_2$) the actuation of the flexured Z actuator is at a peak $Z_1$ such that the cantilever is deflected upwardly at its maximum. At this point, the instruction based on the force gradient is to actuate Z translation to reduce the force to a zero level. The motion of the Z actuator, in response, is linear to the zero point (time $t_3$) where the tip barely contacts the sample surface. As the sample is further withdrawn from the tip, the force remains at zero as there is no binding between the sample and tip.

In each of the methods illustrated in FIGS. 12, 14 and 16, it is notable that the precise Z-positioning provided by scanner 118 of the preferred embodiment enables the use of a wide range of user-defined input profiles, thus allowing FSPM 100 to target measuring particular mechanical properties (e.g., based on sample models) of a wide range of samples.

In contrast, for a soft surface, as shown in FIG. 18C, to achieve the same peak force $F_1$ on the tip of the probe, the force profile shown in FIG. 18A causes the Z piezo to move to a position $Z_2$ in a non-linear path, whereby the value of $Z_2$ is much greater than $Z_1$, thus indicating a softer sample. As a result, with the same force profile, two types of samples can be investigated by considering their position profiles.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method of making a force curve measurement on a sample, the method comprising:
 providing a probe microscope having a probe;
 producing relative motion between the probe and the sample in response to a user-defined input defining intended motion in a direction generally orthogonal to a surface of the sample;
 detecting the relative motion and comparing the relative motion to the corresponding intended motion;
 measuring a force on the probe when the sample interacts with the probe;
 changing a force curve measurement parameter in response to said measuring step; and
 wherein the user-defined input defines at least one of multiple approach moves and multiple retract moves in one cycle.

2. The method of claim 1, further comprising the step of generating relative motion between the probe and the sample in response to said detecting step.

3. The method of claim 1, wherein said measuring step includes detecting a motion of the probe.

4. The method of claim 1, wherein said changing step is performed based on the user-defined input.

5. The method of claim 4, wherein the user-defined input is a path defined by force versus time.

6. The method of claim 5, further including the step of determining a force gradient based on said measuring step performed for at least two points in time.

7. The method of claim 1, wherein the force measurement parameter is a speed associated with said producing step.

8. The method of claim 1, wherein the force curve measurement parameter is pausing said producing step for a predetermined amount of time.

9. The method of claim 1, wherein said producing step is interrupted prior to said changing step.

10. The method of claim 1, wherein said measuring step is performed for at least two points in time, and said changing step is performed in response to a predetermined change in the force.

11. The method of claim 1, wherein said changing step is predetermined.

12. The method of claim 11, wherein said changing step includes modulating a separation between the sample and the probe so that the measured forces corresponding to a plurality of points in time correspond to a predetermined force profile as a function of time.

13. The method of claim 12, wherein said modulating step is performed using a force feedback loop.

14. The method of claim 1, further comprising the step of measuring a separation between the sample and the probe as a function of time.

15. The method of claim 1, wherein said changing step includes controlling the separation between the probe and the sample according to a user-defined path defined by position versus time.

16. The method of claim 1, wherein said producing step is performed by a sensored Z stage.

17. The method of claim 1, wherein the approach and attract moves are each defined by at least one of an associated velocity and an associated direction.

18. A method of making a force curve measurement on a sample, the method comprising:
providing a probe microscope having a probe;
producing relative motion between the probe and the sample in response to a user-defined input defining intended motion in a direction generally orthogonal to a surface of the sample;
detecting the relative motion and comparing the relative motion to the corresponding intended motion;
measuring a force on the probe when the sample interacts with the probe;
changing a force curve measurement parameter in response to said measuring step; and
wherein the force curve measurement parameter is at least one of a direction and a speed associated with said producing step.

19. The method of claim 18, wherein the user-defined input includes a combination of at least four unique segments over one cycle.

20. The method of claim 19, wherein each of the at least four unique segments is defined by at least one of an associated velocity and an associated direction.

21. A method of making a force curve measurement on a sample, the method comprising:
providing a probe microscope having a probe;
producing relative motion between the probe and the sample in response to a user-defined input defining intended motion in a direction generally orthogonal to a surface of the sample;
detecting the relative motion and comparing the relative motion to the corresponding intended motion;
measuring a force on the probe when the sample interacts with the probe;
changing a force curve measurement parameter in response to said measuring step;
wherein said producing step is performed by a sensored Z stare; and
wherein said sensored Z stage is coupled to a piezoelectric tube scanner, said tube scanner providing scanning motion in a plane substantially orthogonal to the third axis.

* * * * *